(12) United States Patent
Asakura et al.

(10) Patent No.: US 9,638,063 B2
(45) Date of Patent: May 2, 2017

(54) STEAM TURBINE FACILITY AND METHOD OF OPERATING THE SAME

(71) Applicant: KABUSHIKI KAISHA TOSHIBA, Minato-ku (JP)

(72) Inventors: Daisuke Asakura, Kawasaki (JP); Koji Kanbe, Kawasaki (JP); Tsutomu Shioyama, Yokohama (JP); Tomoo Oofuji, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 227 days.

(21) Appl. No.: 14/475,847

(22) Filed: Sep. 3, 2014

(65) Prior Publication Data

US 2015/0068207 A1 Mar. 12, 2015

(30) Foreign Application Priority Data

Sep. 6, 2013 (JP) .................. 2013-185697

(51) Int. Cl.
| | | |
|---|---|---|
| *F01D 25/32* | (2006.01) | |
| *F01K 13/00* | (2006.01) | |
| *F01K 7/38* | (2006.01) | |
| *F16T 1/38* | (2006.01) | |
| *F01D 25/08* | (2006.01) | |
| *F02C 6/18* | (2006.01) | |

(52) U.S. Cl.
CPC ............ *F01D 25/32* (2013.01); *F01K 7/38* (2013.01); *F01K 13/006* (2013.01); *F16T 1/38* (2013.01); *F01D 25/08* (2013.01); *F02C 6/18* (2013.01)

(58) Field of Classification Search
CPC .. F01D 25/32; F01D 25/08; F16T 1/38; F01K 7/38; F01K 13/006; F02C 6/18
USPC .......................... 60/685–694, 646, 657, 660
See application file for complete search history.

(56) References Cited

U.S. PATENT DOCUMENTS

| | | | | |
|---|---|---|---|---|
| 4,052,858 A | * | 10/1977 | Jeppson ................. | F01K 17/04 203/95 |
| 4,291,538 A | * | 9/1981 | Husain ................... | F01K 23/04 60/655 |
| 4,691,522 A | * | 9/1987 | Brown, II .............. | F01K 5/00 60/641.8 |
| 4,811,566 A | * | 3/1989 | Silvestri, Jr. .......... | F22B 37/26 55/397 |
| 8,567,196 B2 | * | 10/2013 | Okita ...................... | F01K 7/18 60/641.8 |
| 2010/0050637 A1 | * | 3/2010 | Yamashita ............. | F01K 7/22 60/653 |

* cited by examiner

*Primary Examiner* — Hoang Nguyen
(74) *Attorney, Agent, or Firm* — Oblon, McClelland, Maier & Neustadt, L.L.P.

(57) ABSTRACT

In one embodiment, a steam turbine facility includes drain piping in which a shut-off valve is provided, the drain piping being either a valve drain pipe that leads a drain from the main steam regulating valve to an outside thereof, or a casing drain pipe that leads a drain from the turbine casing to an outside thereof. A heat absorber disposed in a range, upstream of the shut-off valve, of the drain piping to absorb heat of the drain piping.

23 Claims, 15 Drawing Sheets

STEAM TURBINE FACILITY AND METHOD OF OPERATING THE SAME

CROSS REFERENCE TO RELATED APPLICATION

This application is based upon and claims the benefit of priority from Japanese patent application No. 2013-185697 filed on Sep. 6, 2013, the entire contents of which are incorporated herein by reference.

FIELD

Embodiments described herein relate generally to a steam turbine facility and a method of operating the same.

BACKGROUND

A piping system of a steam turbine facility includes a steam piping system that guides steam generated by a boiler to a steam turbine. The steam piping system includes drain piping that discharges drains produced from cold piping and equipment when the steam turbine is warmed-up for operation.

Among the steam piping system, the steam piping connected to a first-stage, high-pressure turbine is referred to as main steam piping. Drain piping for warming-up is connected to various devices, e.g., a steam regulating valve for regulating a steam flow rate, connected to the main steam piping on the downstream thereof, and also to an inner casing surrounding a steam turbine main unit rotated by a steam power disposed further downstream.

A shut-off valve for adjusting the steam flow rate or shutting off the steam is interposed in each drain piping. The drain produced during the warming-up is guided and drained into, for example, a condenser whose internal pressure is lower than that in the main steam piping and that of equipment. The shut-off valve is closed after the warming-up is completed.

In a typical steam turbine equipment, an upper half-side main steam piping and a lower half-side main steam piping are connected to the turbine so that steam can be introduced into the turbine from both the upper half side and the lower half side thereof. In general, each main steam piping is provided with a main steam regulating valve having drain piping.

In a steam turbine piping system as that described above, steam pressure fluctuations occur in a pipeline downstream of the main steam regulating valve, for example, at a portion in the main steam piping downstream of the main steam regulating valve, or at a portion in the drain piping downstream of a valve seat of the main steam regulating valve. Probably due to the design layout of the main steam piping, the steam pressure fluctuations in the main steam piping downstream of the main steam regulating valve are greater in the upper half-side main steam piping and smaller in the lower half-side main steam piping.

Pressure fluctuations occur also inside the inner casing that surrounds the rotating steam turbine due to, for example, current transformation of steam that flows in and the rotating turbine. This results in pressure fluctuations in the drain piping connecting to the inner casing.

A phenomenon is observed in which, in the drain piping connected to the main steam piping or the turbine casing, the temperature of the portion of the drain piping upstream of a shut-off valve abnormally increases during the load increase from the starting-up to the rated operation, if the shut-off valve is closed. Such an abnormal increase of temperature causes material strength of the drain piping to be reduced. When stress produced in the piping by the piping pressure exceeds a permissible level of the piping material under the corresponding temperature, a failure such as burst might occur.

DETAILED DESCRIPTION

The embodiments described herein generally relate to a technique that prevents abnormal overheating of drain piping with a shut-off valve in a steam turbine facility.

The embodiments generally provide a steam turbine facility which includes: a steam turbine including a turbine casing; main steam piping that supplies steam from a boiler to the steam turbine; a main steam regulating valve provided in the main steam piping to adjust a flow rate of steam supplied to the steam turbine; drain piping in which a shut-off valve is provided, the drain piping being either a valve drain pipe that leads a drain from the main steam regulating valve to an outside thereof, or a casing drain pipe that leads a drain from the turbine casing to an outside thereof.

In one embodiment, a heat absorber is disposed in a range, upstream of the shut-off valve, of the drain piping to absorb heat of the drain piping.

In another embodiment, a cover is provided to surround a range, upstream of the shut-off valve, of the drain piping to prevent contact with a surface of the drain piping, the cover being configured to allow a gas to flow therethrough, wherein no heat-insulating material is disposed around the drain piping in the range.

In yet another embodiment, a removable heat-insulating jacket is disposed to surround a range, upstream of the shut-off valve, of the drain piping. In this case, an operation is possible in which, when an abnormal overheat can occur in the drain piping, the heat-insulating jacket may be removed.

In yet another embodiment, a refrigerant path disposed to surround the drain piping, the refrigerant path cooling the drain piping; and a refrigerant circulating arrangement that circulates refrigerant through the refrigerant path. In this case, an operation is possible in which, when an abnormal overheat can occur in the drain piping, the refrigerant may be passed through the refrigerant path.

The embodiments will be described below with reference to the accompanying drawings.

Each of the embodiments to be described hereunder relates to a configuration for preventing abnormal overheating occurring in drain piping due to a thermoacoustic effect, which is described in detail later. Prior to the description for each of the embodiments, an example of drain piping for which an abnormal overheating preventive measure is taken and a portion of a steam turbine facility around the drain piping are described with reference to FIGS. 1 to 5.

Figure 1:
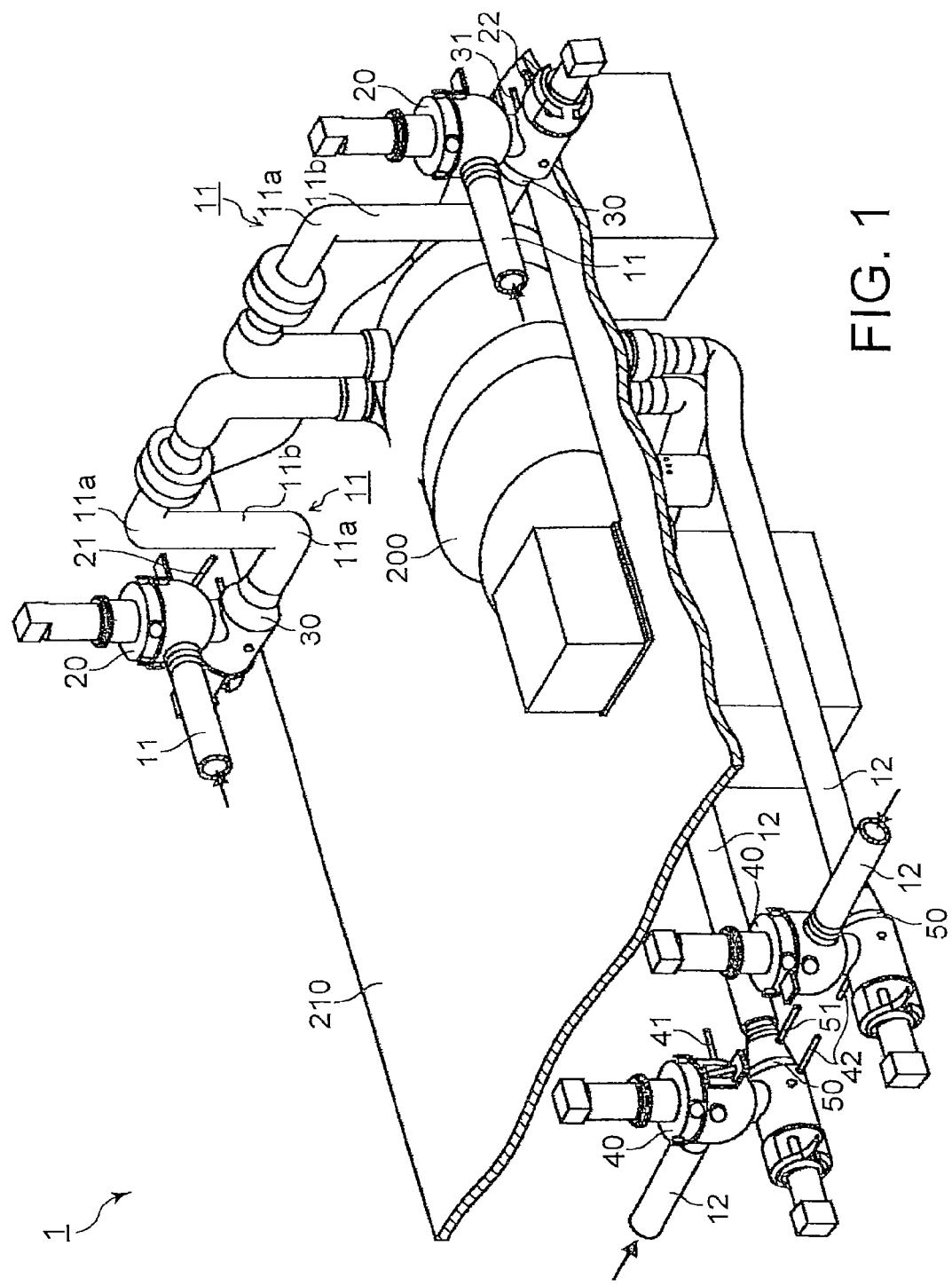
FIG. 1 is a perspective view showing a configuration of piping around a high-pressure turbine in a steam turbine facility in one example.

Referring to FIG. 1, a high-pressure turbine 200 has an upper half and a lower half, to which upper half-side main steam piping 11 and lower half-side main steam piping 12 are respectively connected so as to supply steam thereto from a boiler (not shown). FIG. 1 shows an exemplary configuration having two sets of the upper half-side main steam piping 11 and two sets of the lower half-side main steam piping 12.

The upper half-side main steam piping 11 is provided therein with an upper half-side main steam stop valve 20 to shut off steam supplied from the boiler (not shown) to the high-pressure turbine 200. The upper half-side main steam piping 11 is further provided therein with an upper half-side main steam regulating valve 30 downstream of the upper half-side main steam stop valve 20 to adjust a flow rate of the steam to be supplied to the high-pressure turbine 200.

Similarly to the upper half-side main steam piping 11, the lower half-side main steam piping 12 is provided therein with a lower half-side main steam stop valve 40 to shut off the steam supplied from the boiler (not shown) to the high-pressure turbine 200. The lower half-side main steam piping 12 is further provided with a lower half-side main steam regulating valve 50 downstream of the lower half-side main steam stop valve 40 to adjust the flow rate of the steam to be supplied to the high-pressure turbine 200.

FIG. 1 shows an exemplary configuration in which the upper half side of the high-pressure turbine 200 and the upper half-side main steam piping 11 (including the upper half-side main steam stop valve 20 and the upper half-side main steam regulating valve 30) are disposed above a floor portion 210 that may be called an operating floor, and in which the lower half side of the high-pressure turbine 200 and the lower half-side main steam piping 12 (including the lower half-side main steam stop valve 40 and the lower half-side main steam regulating valve 50) are disposed below the floor portion 210.

As shown in FIG. 1, to achieve reduction in size of the upper half-side main steam piping 11 or a steam turbine building, the portion of the upper half-side main steam piping 11 downstream of the upper half-side main steam regulating valve 30 (the portion is commonly called "main steam lead pipe") has a complicated piping layout including, for example, a straight pipe 11b disposed between an elbow pipe 11a and an elbow pipe 11a.

On the other hand, the lower half-side main steam piping 12 downstream of the lower half-side main steam regulating valve 50 very often has a relatively simple piping layout mainly including horizontal pipes, as compared with the upper half-side main steam piping 11.

The upper half-side main steam stop valve 20 and the lower half-side main steam stop valve 40 are configured similarly to each other. The upper half-side main steam regulating valve 30 and the lower half-side main steam regulating valve 50 are also configured similarly to each other. Thus, drain piping disposed in the upper half-side main steam stop valve 20 and the upper half-side main steam regulating valve 30 shown in FIG. 2 will only be described to represent configurations in the lower half-side main steam stop valve 40 and the lower half-side main steam regulating valve 50.

Figure 2:
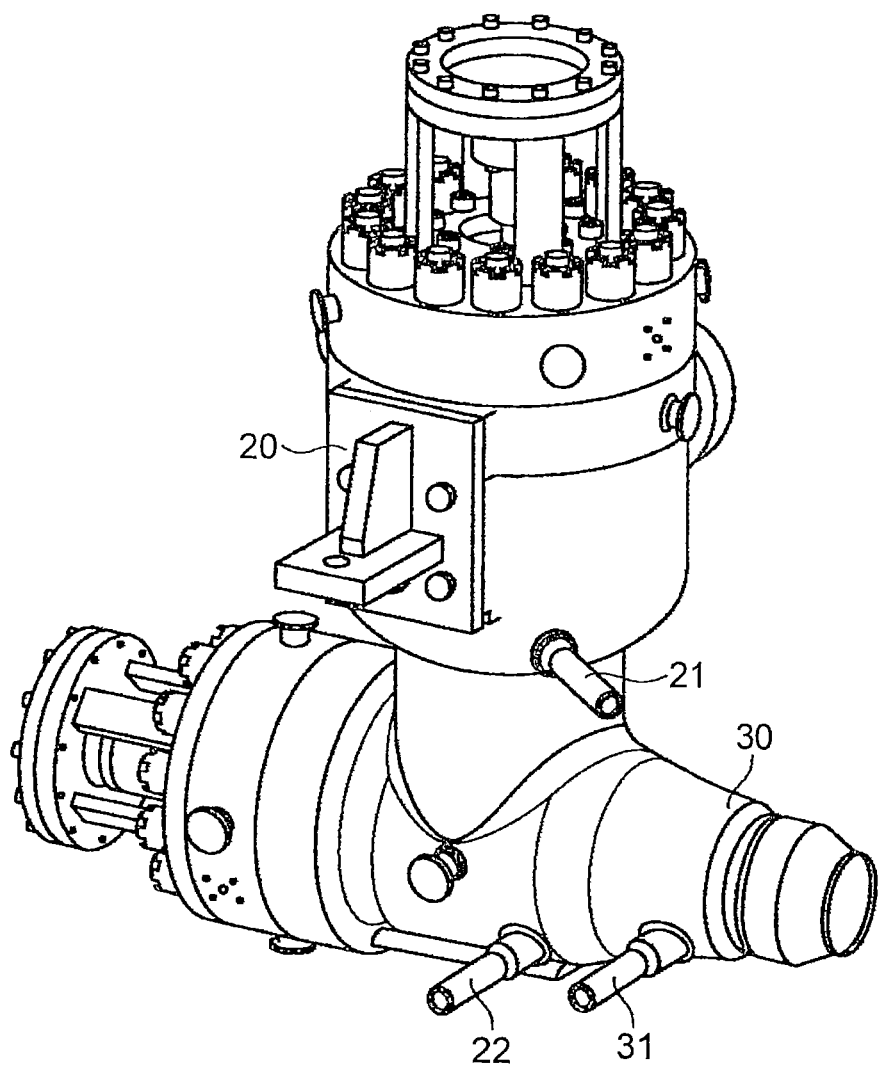
FIG. 2 is a perspective view showing a main steam stop valve shown in FIG. 1.

As shown in FIG. 2, the upper half-side main steam stop valve 20 has an ante-valve-seat drain pipe 21 for draining a drain upstream of a valve seat and a post-valve-seat drain pipe 22 for draining a drain downstream of the valve seat.

The upper half-side main steam regulating valve 30 has a post-valve-seat drain pipe 31 for draining a drain downstream of a valve seat.

In FIG. 1, an ante-valve-seat drain pipe for the lower half-side main steam stop valve 40 is denoted by reference numeral 41 and a post-valve-seat drain pipe for the lower half-side main steam stop valve 40 is denoted by reference numeral 42. A post-valve-seat drain pipe for the lower half-side main steam regulating valve 50 is denoted by reference numeral 51.

Each of the drain pipes (21, 22, 31, 41, 42, 51) has a terminal end communicating with, for example, a condenser (not shown) whose internal pressure is lower than that of the drain pipe. Thus, opening the shut-off valve disposed in each drain pipe causes the drain to be fed to the condenser because of the differential pressure.

A shut-off valve (see, for example, shut-off valves 60, 60' shown in FIG. 3) is disposed in each of the drain pipes (21, 22, 31, 41, 42, 51). The shut-off valve in each drain pipe is opened during warming-up of the high-pressure turbine 200 so that the drain produced in the upper half-side main steam piping 11 or the lower half-side main steam piping 12 is fed to the condenser. In general, the shut-off valve in each drain pipe is closed after the warming-up is completed in order to minimize loss of steam energy for rotating the high-pressure turbine 200.

To represent each of the drain pipes (21, 22, 31, 41, 42, 51), the post-valve-seat drain pipe 31 of the upper half-side main steam regulating valve 30 and an inner casing drain pipe 33 of the high-pressure turbine 200 will be described together with a piping configuration that surrounds the same will be described below with reference to FIG. 3.

Figure 3:
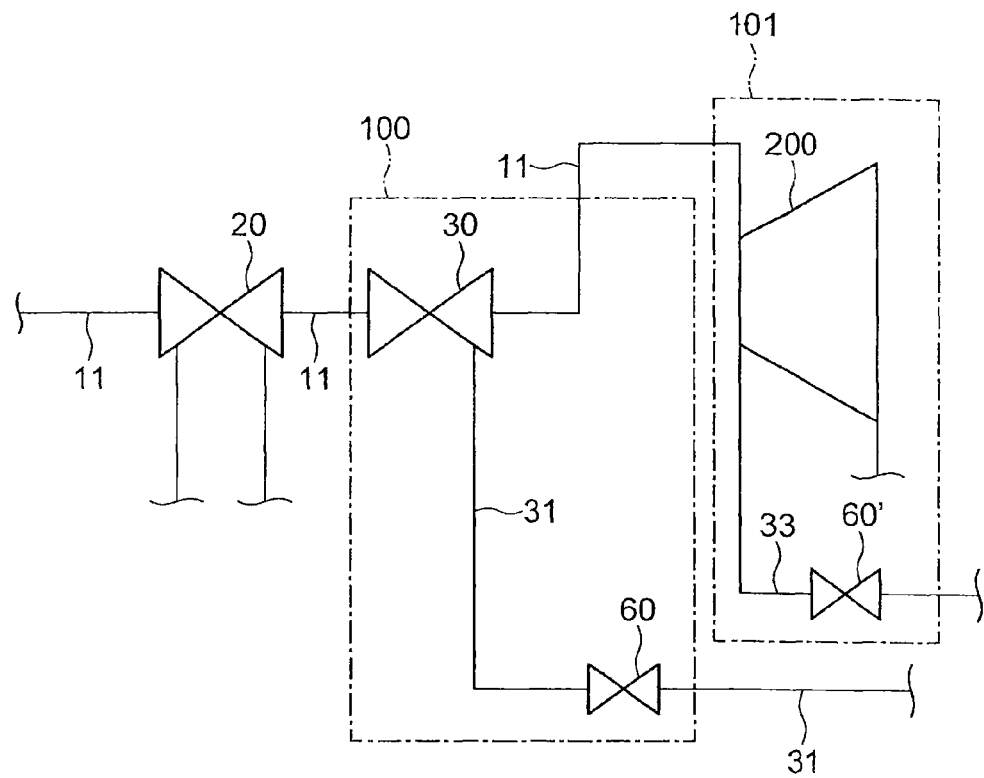
FIG. 3 is a piping diagram showing a section around the high-pressure turbine in the steam turbine facility.

Steam that comes from the boiler (not shown) on the left of what are shown in FIG. 3 is supplied through the upper half-side main steam piping 11 and flows past the upper half-side main steam stop valve 20. The flow rate of the steam is then regulated by the upper half-side main steam regulating valve 30 before being supplied to the high-pressure turbine 200.

The post-valve-seat drain pipe 31 is connected to the upper half-side main steam regulating valve 30 so as to branch from the upper half-side main steam piping 11. The shut-off valve 60 is disposed in a downstream area of the post-valve-seat drain pipe 31. On the downstream side of the shut-off valve 60, the post-valve-seat drain pipe 31 leads to the condenser (not shown) provided on the right of what are shown in FIG. 3. Specifically, the drain produced during warming-up is drained to the condenser.

Figure 4:
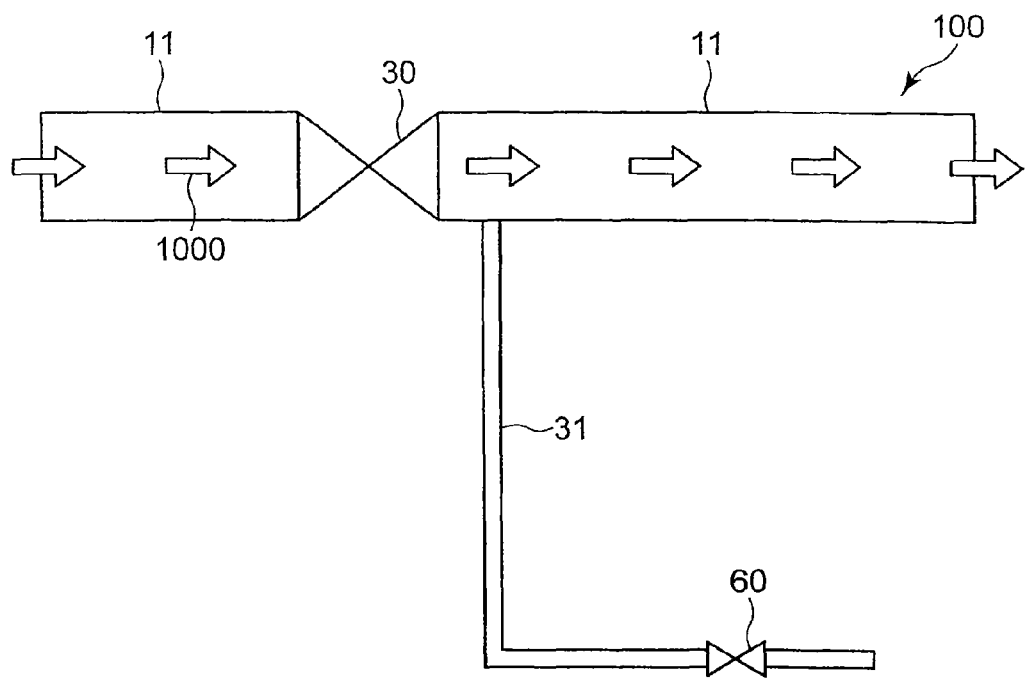
FIG. 4 is a diagram schematically showing a configuration of piping included in an area 100 shown in FIG. 3.

FIG. 4 is a diagram schematically showing an area 100 enclosed by a dash-single-dot line in FIG. 3. In FIG. 4, a stream of the steam flowing through the inside of the upper half-side main steam piping 11 is indicated by an arrow 1000.

Reference is made back to FIG. 3. The upper half-side main steam piping 11 downstream of the upper half-side main steam regulating valve 30 leads to an inlet of the high-pressure turbine 200. The inner casing drain pipe 33 for draining a drain produced during warming-up of the high-pressure turbine 200 is connected to an inner casing inlet of the high-pressure turbine 200. The shut-off valve 60' is disposed downstream of the inner casing drain pipe 33.

Figure 5:
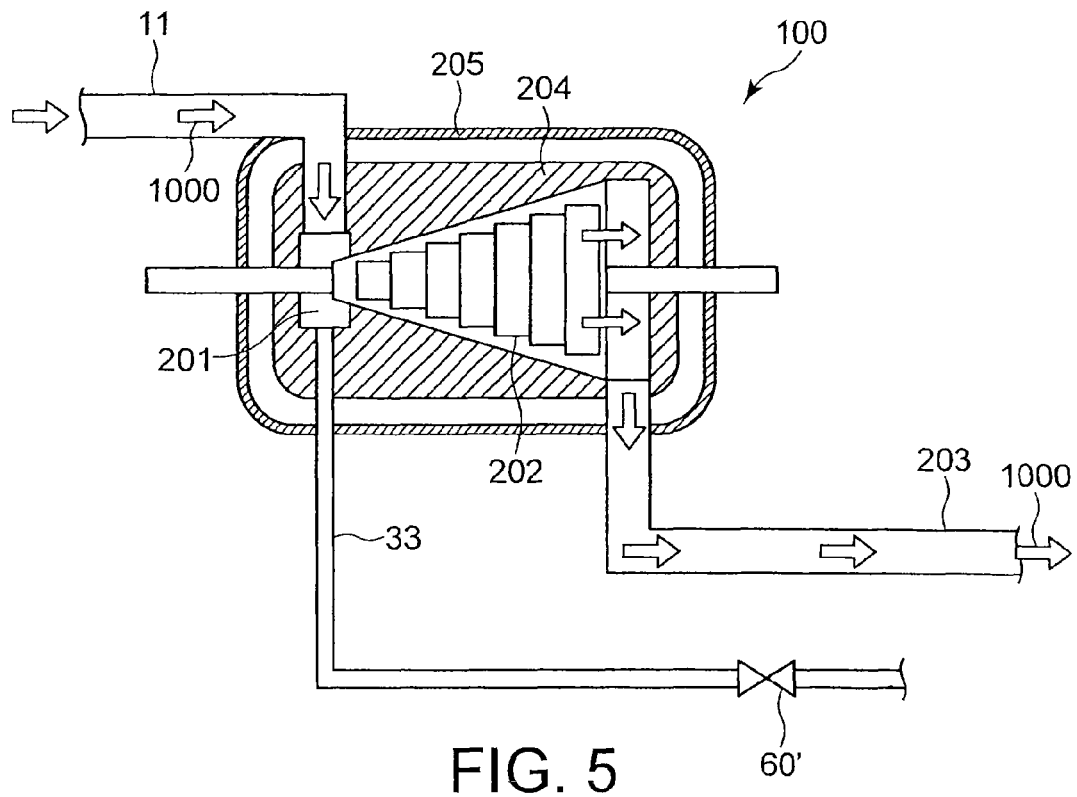
FIG. 5 is a diagram schematically showing a configuration of the high-pressure turbine and the piping included in an area 101 in FIG. 3.

FIG. 5 is a diagram schematically showing an area 101 enclosed by a dash-double-dot line in FIG. 3. The area 101 includes an internal configuration of the high-pressure turbine 200. Again in FIG. 5, the stream of the steam is indicated by the arrow 1000.

From the left side of what are shown in FIG. 5, the main steam flows through the inside of the upper half-side main steam piping 11 downstream of the upper half-side main steam regulating valve 30, and reaches the high-pressure turbine 200.

The high-pressure turbine 200 has a dual casing structure comprising an inner casing 204 and an outer casing 205. Turbine rotor blades 202 rotated by steam energy are disposed inside the inner casing 204.

A small chamber called a nozzle box 201 is disposed at a steam inlet portion of the inner casing 204. The steam that has reached the high-pressure turbine 200 is guided into this nozzle box 201.

The steam that has reached the nozzle box 201 flows rightwardly from the left in FIG. 5 while rotating the turbine rotor blades 202, flows out to a main steam exhaust pipe 203, and returns to the boiler (not shown). The steam returned to the boiler is reheated by the boiler and supplied to a medium-pressure turbine (not shown).

The inner casing drain pipe 33, for collecting the drain produced during warming-up of the equipment including the high-pressure turbine 200 and the steam piping, is connected to the nozzle box 201. The shut-off valve 60' is provided in the inner casing drain pipe 33.

The drains produced in the upper half-side main steam piping 11 and in various equipment are passed through the inner casing drain pipe 33, and are drained to and collected in the condenser (not shown), which is connected to the inner casing drain pipe 33 at a point downstream of the shut-off valve 60'.

The foregoing steam turbine facility is mere an example, and thus various configurations are possible. In a nuclear power plant, for example, the exhaust steam having finished the work in the high-pressure turbine 200 is not reheated by the boiler; instead, the exhaust steam is guided into steam piping called "cross-around piping" to be directly fed to a subsequent low-pressure turbine to rotate it.

In the steam turbine facility described above with reference to FIGS. 1 to 5, a phenomenon was observed in which the drain piping upstream of the shut-off valves 60, 60' abnormally overheats when the shut-off valves 60, 60' are closed in the post-valve-seat drain pipe 31 connected to the downstream side of the upper half-side main steam regulating valve 30 and in the inner casing drain pipe 33 connected to the nozzle box 201 of the inner casing of the high-pressure turbine 200.

It was reported that such abnormal overheating occurs not at all times during steam turbine operation, but for an very short period of time from a point of time when the shut-off valves 60, 60' are closed after the start-up of the steam turbine and after completion of the warming-up, to a point of time at which transition into a steady-state load condition (e.g. a rated load operation) is completed and thus the steady-state load condition is established. An analysis made by the inventor reveals that the abnormal overheating is attributable to the thermoacoustic effect to be described in detail later. Embodiments, each representing a measure for preventing the abnormal overheating, will hereinafter be described.

A common measure for preventing the abnormal overheating can be applied to both the post-valve-seat drain pipe 31 and the inner casing drain pipe 33. A case in which the abnormal overheating measure is applied to the post-valve-seat drain pipe 31 will representatively be described below.

For simplicity, the "post-valve-seat drain pipe 31" is also referred to as a "drain pipe 31", the "upper half-side main steam piping 11" is also referred to as "steam piping 11", and the "upper half-side main steam regulating valve 30" is also referred to as a "steam regulating valve 30", hereinafter.

<First Embodiment>

Figure 6:
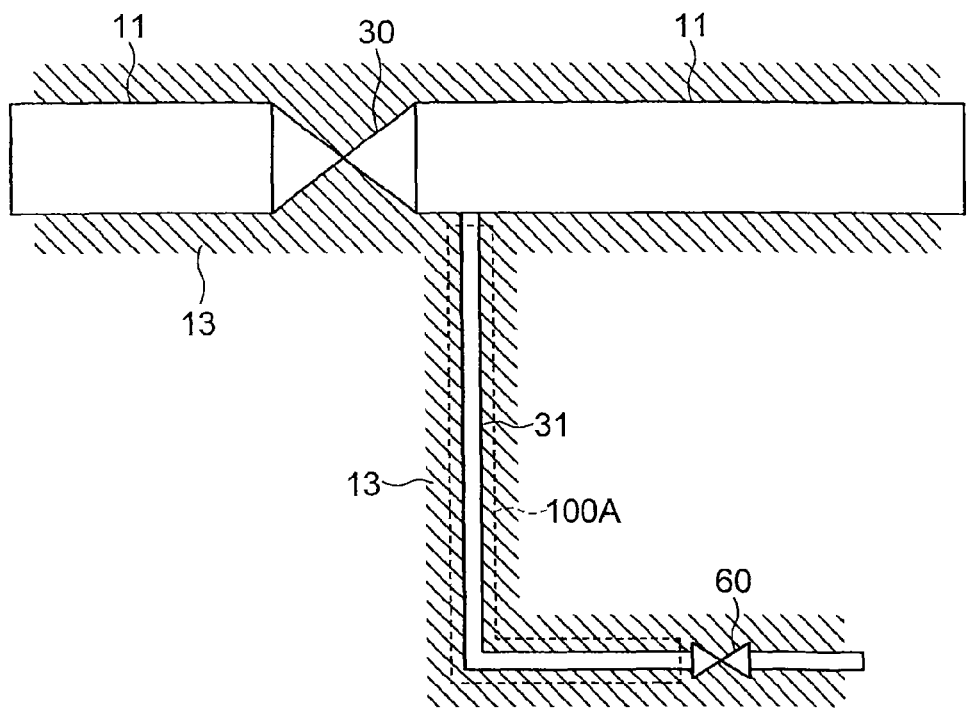
FIG. 6 is a diagram schematically showing a configuration of the piping included in the area 100 shown in FIG. 3 according to a first embodiment.

The first embodiment will be described with reference to FIGS. 6 to 10. FIG. 6 shows a piping configuration in the first embodiment. In addition to the piping configuration shown in FIG. 4, the steam piping 11, the steam regulating valve 30, the drain pipe 31, and the shut-off valve 60 are covered in a heat-insulating material 13 that may, for example, be called as a "heat insulator" by one of ordinary skill in the art. It is common practice in steam turbine facilities to apply the heat-insulating material 13 to the portions cited above.

The heat-insulating material 13 for the steam piping 11 and the steam regulating valve 30 is applied mainly to prevent heat dissipation from the surfaces of the steam piping 11 and the steam regulating valve 30 to the atmosphere, thereby preventing plant efficiency from being reduced due to a reduced main steam temperature. Meanwhile, the heat-insulating material 13 on the drain pipe 31 is mainly intended to protect an operator or a worker from burns, in addition to preventing the plant efficiency from being reduced.

In the entire range of the drain pipe 31 extending from a drain pipe branch point of the steam piping 11 to the shut-off valve 60 or in the part of the range, the foregoing abnormal overheating was observed. The range is indicated as an area 100A enclosed by a broken line in FIG. 6.

Figure 7:
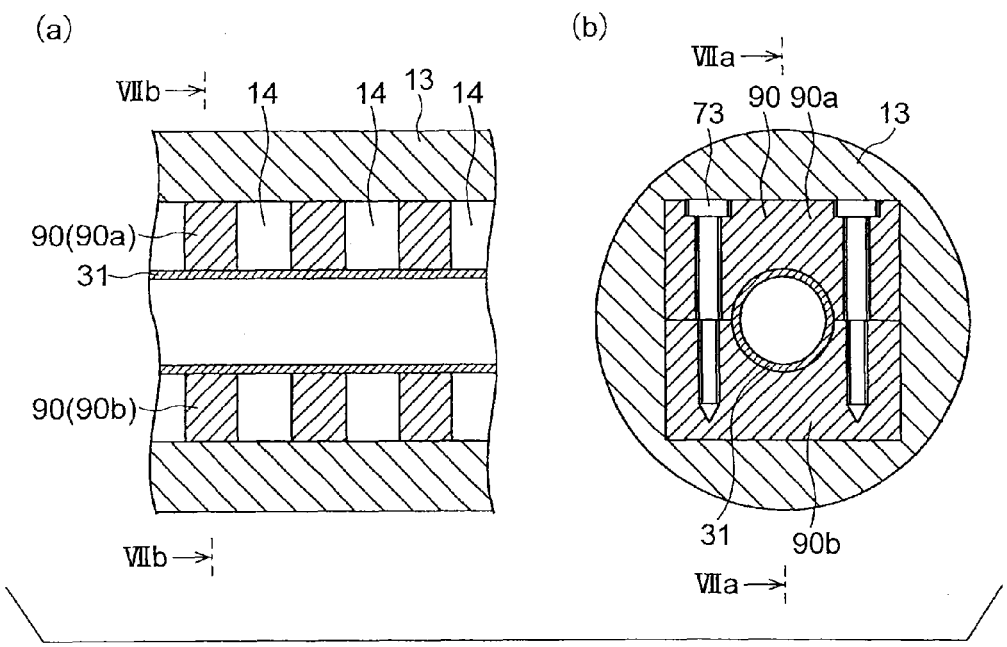
FIG. 7 shows cross-sectional views showing a configuration of a heat absorber disposed in an area 101A shown in FIG. 6, where (a) is a longitudinal cross-sectional view and (b) is a transverse cross-sectional view.

To prevent the abnormal overheating, a heat absorber 90 formed of a metal is attached so as to surround the drain pipe 31 beneath the heat-insulating material 13 as shown in FIG. 7 over the entire area 100A or a part of the area 100A shown in FIG. 6.

Referring to FIG. 7, the heat absorber 90 is a generally rectangular, ring-shaped plate having a hole at a center thereof, the hole having an inside diameter corresponding to an outside diameter of the drain pipe 31. The heat absorber 90 comprises two heat absorber half bodies 90a, 90b. The half bodies 90a, 90b are fixed to the drain pipe 31 as follows: specifically, the half bodies 90a, 90b are placed on the drain pipe 31 so as to sandwich the drain pipe 31 and two bolts 73 are then fastened together.

Having the heat absorber 90 achieves the following effect. Specifically, even when the abnormal overheating occurs in the drain pipe 31, the heat in the drain pipe 31 is transmitted to the heat absorber 90 through heat conduction. This reduces a rise in temperature of the drain pipe 31, thereby preventing the drain pipe 31 from, for example, being broken.

The foregoing paragraph (four paragraphs earlier) recites that the abnormal overheating occurs over the entire range of a part of the range from the branch point of the drain pipe 31 from the steam piping 11 to the shut-off valve 60. It is, however, difficult to identify a specific part of the range where abnormal overheating occurs, with the use of currently available techniques. It is thus preferable that, in the first operation, temperature rise in the drain pipe 31 is measured using thermocouples are affixed to the surface of the drain pipe 31 or a noncontact temperature detector. This enables to determine the portions where the heat absorber 90 should be provided. It has been confirmed by the previous observations that the location where the abnormal overheating occurs is reproducible.

Examples of the material used for the heat absorber 90 include the metal used for the drain pipe 31, e.g. iron, and metallic materials having a high thermal conductivity, e.g. copper and aluminum.

Preferably, an outer peripheral surface of the drain pipe 31 and an inner peripheral surface of the hole in the heat absorber 90 are in close contact with each other while leaving no gap or smallest possible gaps therebetween, which increases an amount of heat transferred from the drain pipe 31 to the heat absorber 90.

To this end, a thin metal plate, metal tape, metal plating, or the like filling the gaps between the drain pipe 31 and the heat absorber 90 may be applied to at least either one of the drain pipe 31 and the heat absorber 90.

Pressure inside the drain pipe 31 is not directly loaded on the heat absorber 90. Thus, unlike the case of designing the drain pipe 31, strength calculations considering the internal steam pressure are not required for determination of the specifications for the heat absorber 90.

The mass required for the heat absorber 90 by itself to absorb heat of the drain pipe 31 is estimated.

It is assumed that the same kind of metal as that used for the drain pipe 31 is used for the heat absorber 90. The total mass of a plurality of heat absorbers 90 is considered to be heat capacity equivalent mass.

Assuming that the drain pipe 31 in the actual facility has an outside diameter of 48.3 mm and a thickness of 10 mm, the drain pipe 31 weighs about 9.6 kg per meter. A mass of about 9.6 kg or more is thus required for the heat absorber 90.

Manufacture a square heat absorber 90 having a side of 120 mm and a central hole diameter of 48.3 mm. Then, an overall volume of the heat absorber 90 is "9600 g/7.85 g/cm$^3$=1222.9 cm$^3$=1222900 mm$^3$" and thus a total thickness of the heat absorber 90 is "1222900/((120$^2$−48.3$^2$)*π/4))=97.3 [mm]". Specifically, a heat absorber 90 with a total thickness of 97.3 [mm] needs to be disposed per one meter of the drain pipe 31. Assuming that one heat absorber 90 has a thickness of 10 mm, about ten pieces of the heat absorbers 90 need to be disposed at equal intervals per one meter of the drain pipe 31.

As shown in FIG. 7(a), it is preferable that a space (cavity) 14 is left between adjacent heat absorbers 90, instead of the heat-insulating material 13 being disposed therebetween. Specifically, it is preferable that there is a space 14 is enclosed by an inner surface of the heat-insulating material 13, side surfaces of the heat absorber 90, and the outer peripheral surface of the drain pipe 31.

If the heat-insulating material 13 fully fills the space 14, heat of the drain pipe 31 is stored in the heat-insulating material 13, causing the temperature of the drain pipe 31 to increase abnormally. This halves the overheating preventive effect of the heat absorber 90.

Figure 8:
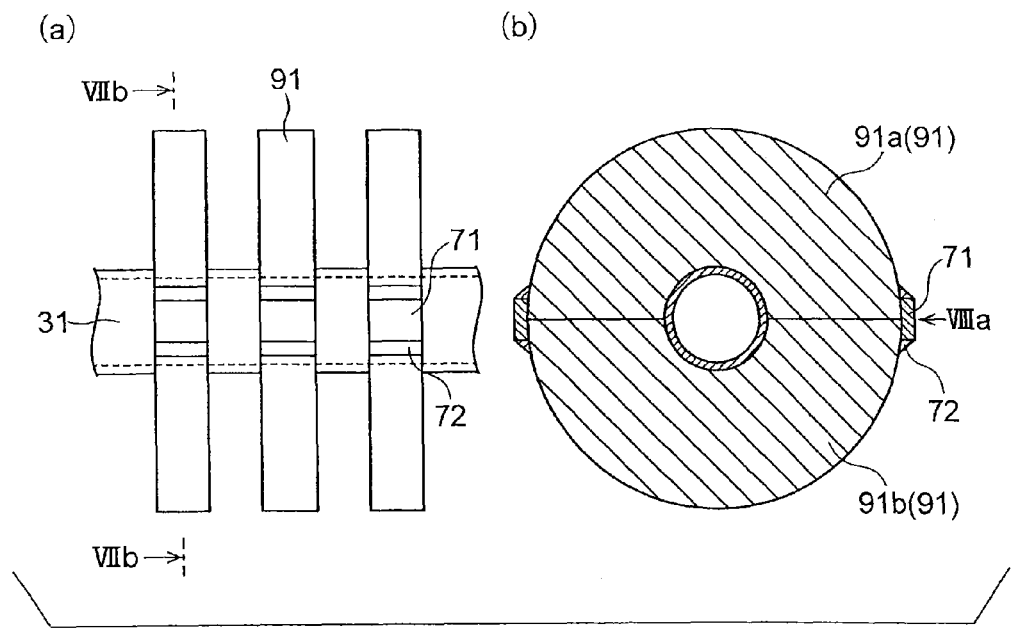
FIG. 8 shows cross-sectional views showing a heat absorber according to another embodiment, where (a) is a longitudinal cross-sectional view and (b) is a transverse cross-sectional view.

FIG. 8 shows a heat absorber in another embodiment. This heat absorber 91 shown in FIG. 8 is a generally circular, ring-shaped plate having a hole at a center thereof, the hole having an inside diameter corresponding to an outside diameter of the drain pipe 31. The heat absorber 91 comprises two heat absorber half bodies 91a, 91b. The half bodies 91a, 91b are fixed to the drain pipe 31 as follows: specifically, the half bodies 91a, 91b are placed on the drain pipe 31 so as to sandwich the drain pipe 31 and integrated with each other through a fillet weld 72 via a welding piece 71.

FIG. 8 omits showing the heat-insulating material. If the heat-insulating material is to be disposed, preferably, a space (cavity) is left between adjacent heat absorbers 91, instead of the heat-insulating material being disposed therebetween, just as in the case shown in FIG. 7.

Also in the case shown in FIG. 8, it is preferable there is no gap between the drain pipe 31 and the heat absorber 91, so that the performance for absorbing heat from the drain pipe 31 is improved.

Figure 9:
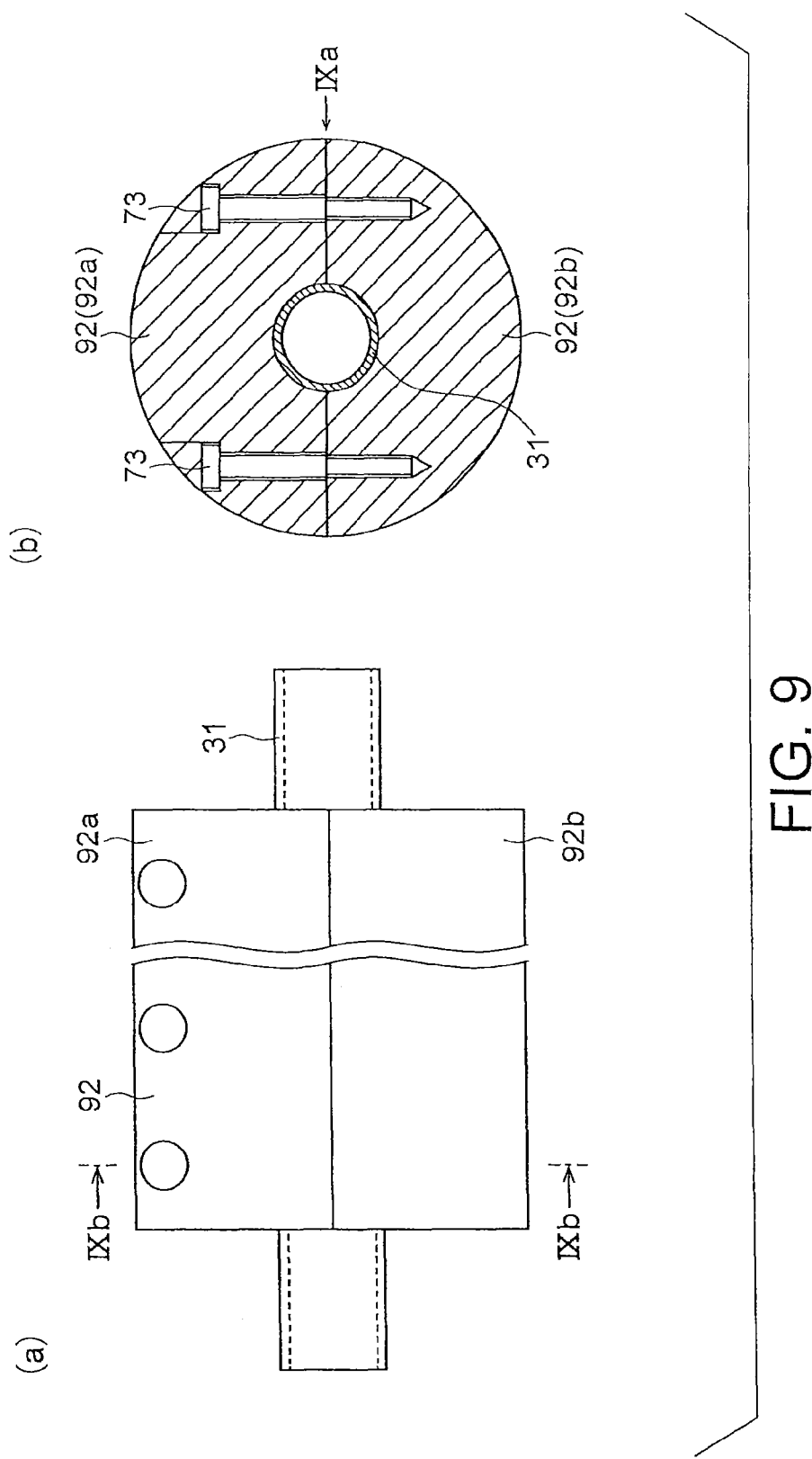
FIG. 9 shows cross-sectional views showing a heat absorber according to still another embodiment, where (a) is a longitudinal cross-sectional view and (b) is a transverse cross-sectional view.

FIG. 9 shows cross-sectional views showing a heat absorber according to still another embodiment. The heat absorber 92 shown in FIG. 9 has a length such that a relatively long range of the drain pipe 31, or an entire or substantially entire range of the area 100A of the drain pipe 31 can be covered by a single heat absorber 92.

As with the heat absorber 90 shown in FIG. 7, the heat absorber 92 shown in FIG. 9 comprises two half bodies 92a, 92b that are fastened together with bolts 73 to be fixed to the drain pipe 31. The heat absorber 92 shown in FIG. 9 may be fixed to the drain pipe 31 by welding similar to that used with the heat absorber 91 shown in FIG. 8.

Again, preferably, there is no clearance between the drain pipe 31 and the heat absorber 92, so that the performance for absorbing heat from the drain pipe 31 is improved.

Assuming that the heat absorber 92 shown in FIG. 9 has an outside diameter equal to that of the heat absorber 91 shown in FIG. 8, the heat absorber 92 shown in FIG. 9 has greater total mass for the zero clearance between the adjacent heat absorbers, so that capacity of heat to be absorbed from the drain pipe 31 can be increased. On the other hand, weight per heat absorber increases, which degrades ease of installation.

Figure 10:
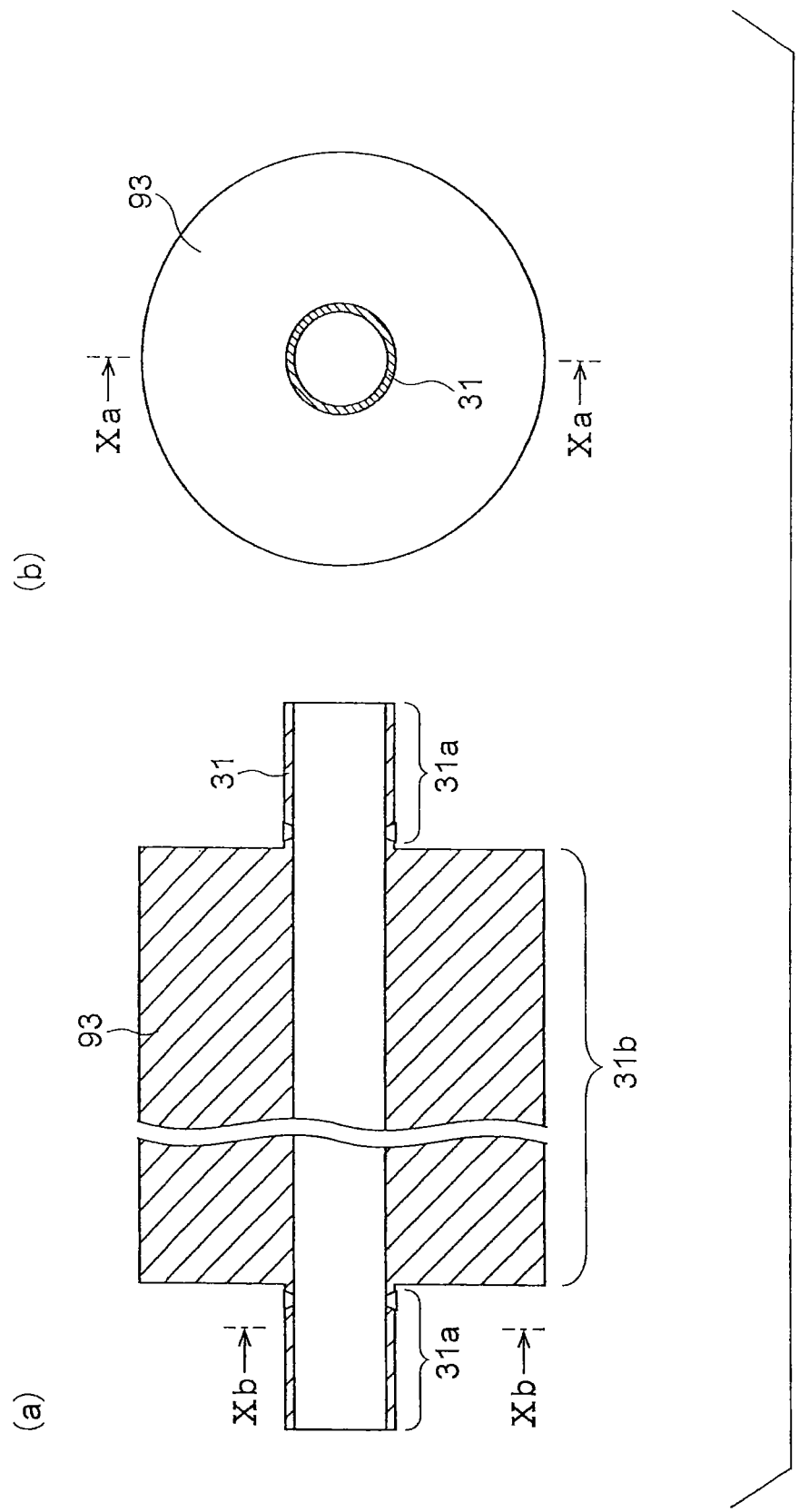
FIG. 10 shows cross-sectional views showing a heat absorber according to a further embodiment, where (a) is a longitudinal cross-sectional view and (b) is a transverse cross-sectional view.

FIG. 10 shows a heat absorber in yet another embodiment. FIG. 10 shows a configuration in which part of the drain pipe 31 having an ordinary wall thickness is replaced by a thick-walled pipe 93. Specifically, the drain pipe 31 comprises a first portion 31a that is a drain pipe portion having an ordinary wall thickness and a thick-walled second portion 31b joined to the first portion 31a through welding or other joining technique. In this case, a portion of the thick-walled pipe 93, specifically, the second portion 31b disposed radially outside of an outer peripheral surface of the first portion 31a provides the heat absorber.

The configuration shown in FIG. 10 may be achieved by cutting out part of the existing drain pipe 31 and then joining the thick-walled pipe 93 to the cutout portion. Alternatively, the configuration may be achieved by installing a drain pipe 31 having varying wall thicknesses at the initial installation of the plant.

In the first embodiment (the embodiments shown in FIGS. 6 to 10) described above, even when overheating arising from the thermoacoustic effect (to be described later) produced by fluctuations in pressure of a liquid in the drain pipe 31 occurs in the range of the drain pipe 31 upstream of the shut-off valve 60, the heat absorbers 90 to 93 absorb heat, thereby preventing the drain pipe 31 from abnormally overheating. The drain pipe 31 can thus be prevented from bursting.

If another measure is taken in the first embodiment to prevent a plant worker from accessing (touching) the drain pipe 31, the heat-insulating material 13 around the drain pipe 31 may be omitted. In this case, the drain pipe 31 can be prevented from overheating through a relatively simple procedure of peeling off the heat-insulating material 13 from the existing drain pipe 31 and additionally installing the heat absorbers 90 to 93. Even if the heat-insulating material 13 is installed as a final step, a step of installing the heat-insulating material 13 simply needs to be added to the above-described procedure.

Specifically, in the first embodiment, a measure can be taken in an existing plant through a relatively simple procedure to prevent piping from overheating as caused by the thermoacoustic effect.

<Second Embodiment>

A second embodiment will be described below with reference to FIGS. 11 to 14. The second embodiment eliminates the heat-insulating material 13 or allows the heat-insulating material 13 to be removed as necessary in order to improve heat dissipation from the drain pipe 31 for the prevention of overheating of the drain pipe 31. In the second embodiment, the same parts are designated by the same reference numerals as those used in the first embodiment and descriptions for those parts will be omitted or simplified.

Figure 11:
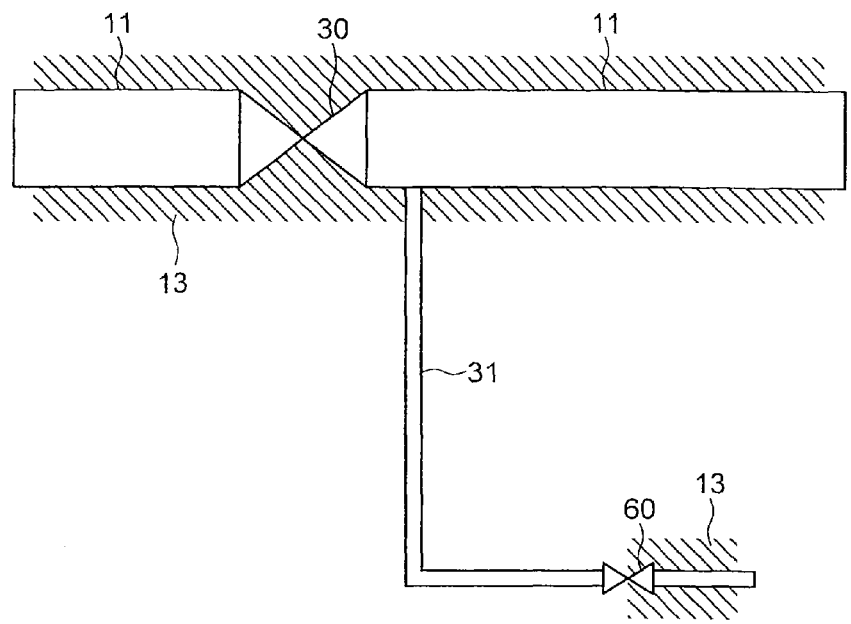
FIG. 11 is a diagram schematically showing a configuration of the piping included in the area 100 shown in FIG. 3 according to a second embodiment.

Referring to FIG. 11, in the second embodiment, the heat-insulating material 13 is disposed, as has conventionally been done, on the steam piping 11, the steam regulating valve 30, and the drain pipe 31 downstream of the shut-off valve 60. The heat-insulating material 13 is not, however, disposed on at least part of a range in the drain pipe 31 from the branch point from the steam piping 11 to the shut-off valve 60 (the area 100A shown in FIG. 6), preferably an entire or substantially entire area of the range.

As described earlier, the reasons that the steam turbine facility is provided with the heat-insulating material are to prevent thermal loss arising from the steam turbine efficiency, and to prevent burns. In the drain pipe 31, since the shut-off valve 60 is closed at almost all time during the operation of the steam turbine, there is no steam flow in the drain pipe 31. In view of the fact, regarding the drain pipe 31, there is no problem of thermal loss causing the reduction of the turbine rotation efficiency.

Thus, the only possible risk involved in the operation of the facility associated with the removal of the heat-insulating material 13 from the drain pipe 31 as shown in FIG. 11 is that a plant worker, for example, inadvertently touches the drain pipe 31 and gets burned.

The heat-insulating material 13 can therefore be removed from the drain pipe 31 by calling the plant worker's attention, providing an alternative device for preventing a possible contact by the worker, and taking related measures.

As mentioned earlier, the abnormal overheating of the drain pipe 31 occurs for only a limited short period of time. A mode of operation is thus possible in which the heat-insulating material 13 is removed from the drain pipe 31 only during a time period in which the abnormal overheating occurs and is mounted on the drain pipe 31 in other time periods.

Figure 12:
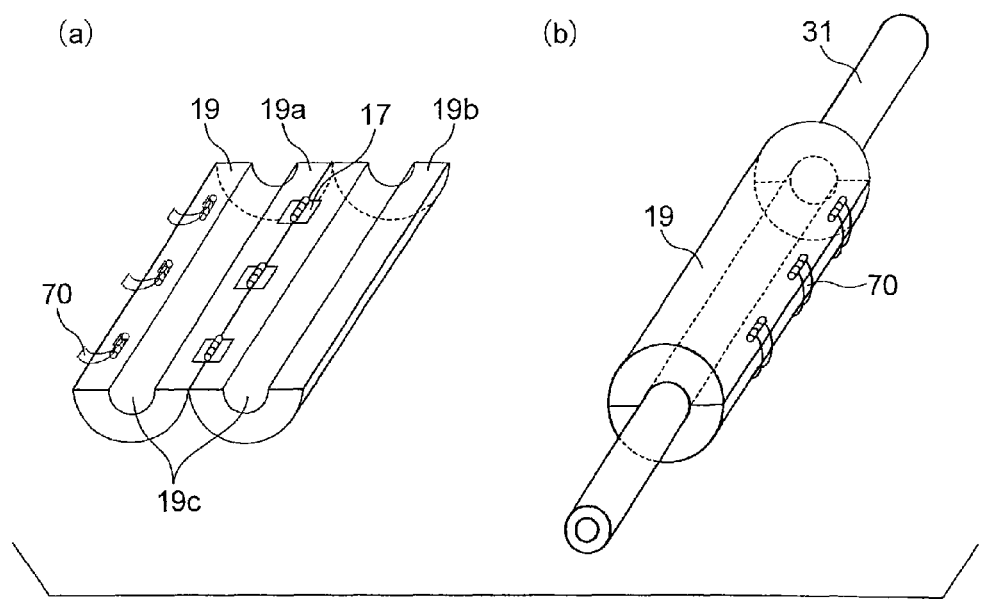
FIG. 12 shows perspective views showing a structure of a heat-insulating jacket removably disposed in the drain piping shown in FIG. 11, where (a) shows a condition in which the heat-insulating jacket is opened and (b) shows a condition in which the heat-insulating jacket is closed (in a mounted condition).

FIG. 12 shows a heat-insulating jacket 19 suitable in such an application as that described above. The heat-insulating jacket 19 comprises a heat-insulating material or a combination of a heat-insulating material covered in a jacket, having a generally cylindrical shape. The heat-insulating jacket 19 has a hole with an inside diameter corresponding to the outside diameter of the drain pipe 31.

The heat-insulating jacket 19 includes two half bodies 19a, 19b connected to each other by hinges (hinge joints) 17. Each of the half bodies 19a, 19b has a groove 19c having a semicircular cross section. In addition, the heat-insulating jacket 19 has spring fasteners (locking devices) 70 for maintaining a closed position of the two half bodies 19a, 19b (see FIG. 12(b)).

The heat-insulating jacket 19 can be manually mounted on, or removed from, the drain pipe 31 easily. At installation, the drain pipe 31 is fitted in the groove 19c in the half body 19a, the other half body 19b is placed over the drain pipe 31 and the half body 19a, and the half bodies 19a, 19b are then locked in place with the spring fasteners 70. An appropriate type of working robot may even be applied to mount or remove the heat-insulating jacket 19.

The method for fixing the heat-insulating jacket 19 to the drain pipe 31 shown in FIG. 12 is not the only possible method. For example, the two half bodies 19a, 19b of the heat-insulating jacket 19 may be maintained in the closed position using screw bolts.

Figure 13:
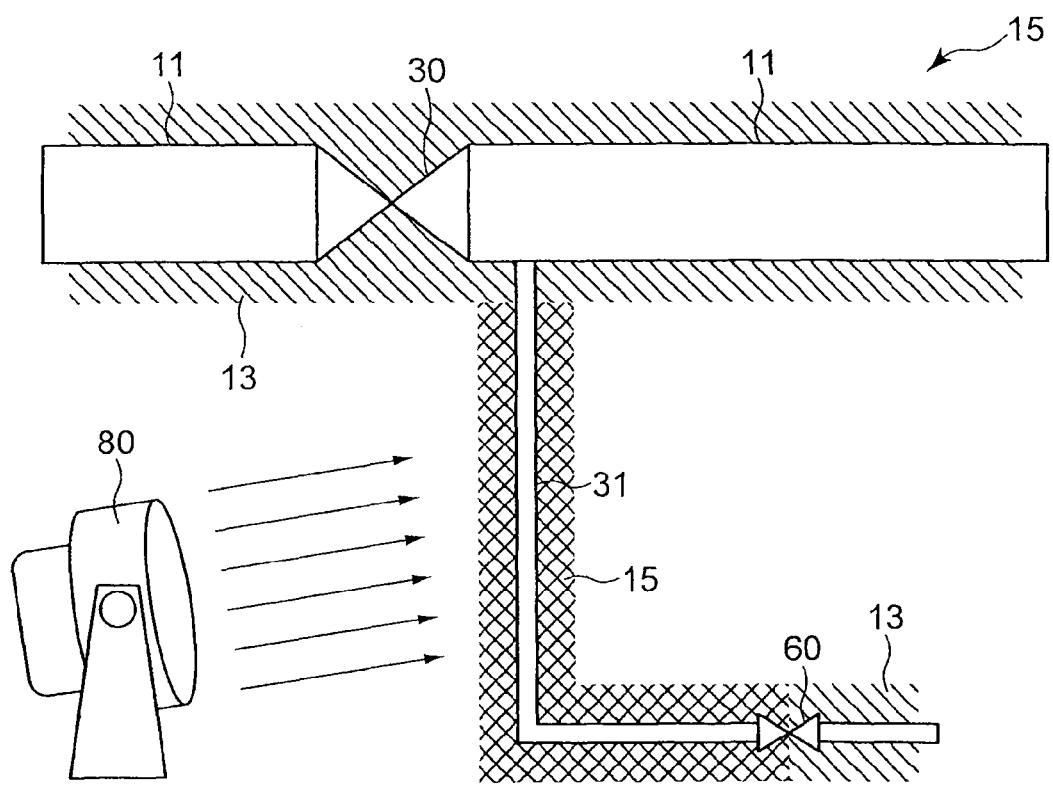
FIG. 13 is a diagram schematically showing a configuration of the piping included in the area 100 shown in FIG. 3 according to a third embodiment.
Figure 14:
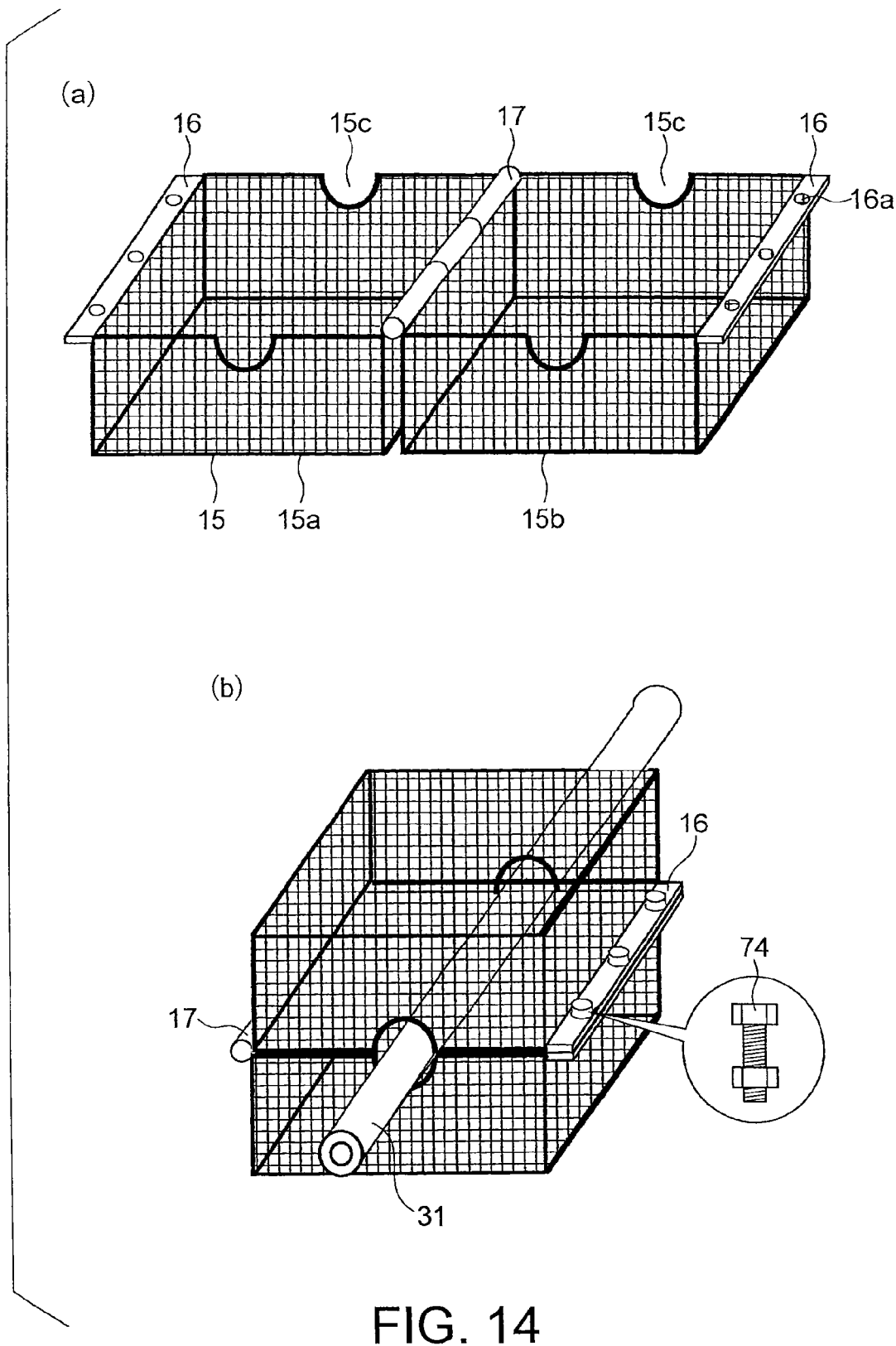
FIG. 14 shows perspective views showing a mesh jacket removably disposed in the drain piping shown in FIG. 13, where (a) shows a condition in which the mesh jacket is opened and (b) shows a condition in which the mesh jacket is closed (in a mounted condition).

FIGS. 13 and 14 show configurations that ensure proper heat dissipation from the drain pipe 31 and prevent burns. The configurations each include a mesh jacket 15, instead of the conventional heat-insulating material, disposed so as to surround the drain pipe 31.

Referring to FIG. 13, the heat-insulating material 13 is removed from the drain pipe 31 over a range from its branch point from the steam piping 11 to the shut-off valve 60, specifically, the range over which the abnormal overheating can occur and, instead, a mesh jacket 15 is installed over the range.

The mesh jacket 15 offers good ventilation. Thus, installing a blower 80 as shown in FIG. 13 allows the drain pipe 31 to be forcedly air-cooled via the mesh jacket 15. The blower 80 may be omitted.

With the blower 80 installed in the steam turbine facility, preferably, the steam turbine facility is operated such that the blower 80 is operated only under a condition in which the abnormal overheating due to the foregoing thermoacoustic effect may occur and the blower 80 is stopped under any other conditions.

Using metal for the material of the mesh jacket 15 is safe from the standpoint of strength. If a material having a high thermal conductivity is used, however, the mesh jacket 15 may have a surface temperature that can cause burns because of heat transfer and radiant heat from the drain pipe 31 involved. To achieve safer prevention of burns, therefore, it is appropriate to manufacture the mesh jacket 15 from a material having as low a thermal conductivity as possible, e.g., an inorganic, hard heat-resisting material.

As shown in FIG. 14(a), the mesh jacket 15 includes two half bodies 15a, 15b connected to each other by a hinge (hinge joint) 17. The half bodies 15a, 15b each have a fastening plate 16 having a plurality of, three in the example shown in FIG. 14(a), holes 16a. The half bodies 15a, 15b each have semicircular cutouts 15c formed in both sides thereof. The cutouts 15c receive the drain pipe 31 passed therethrough. The cutouts 15c have an inside diameter not smaller than the outside diameter of the drain pipe 31.

The mesh jacket 15 can be mounted over the drain pipe 31 as follows. Specifically, referring to FIG. 14(b), the two half bodies 15a, 15b are mated with each other and closed so as to sandwich the drain pipe 31 and the half bodies 15a, 15b are fastened together using bolts and nuts 74 installed in the holes 16a in the fastening plates 16.

The mesh jacket 15, though shown in FIG. 14 as a rectangular parallelepiped, may have any other shape, e.g., a cylinder.

The second embodiment described above promotes heat dissipation from the drain pipe 31, thereby preventing the temperature on the inner surface of the drain pipe 31 from increasing abnormally due to the thermoacoustic effect.

<Third Embodiment>

A third embodiment will be described below with reference to FIGS. 15 to 18. The third embodiment includes a refrigerant path disposed around the drain pipe 31, the refrigerant path allowing a refrigerant to flow therethrough to thereby cool the drain pipe 31. The specific portion cooled in the drain pipe 31 is the same as that in the first and second embodiments.

Figure 15:
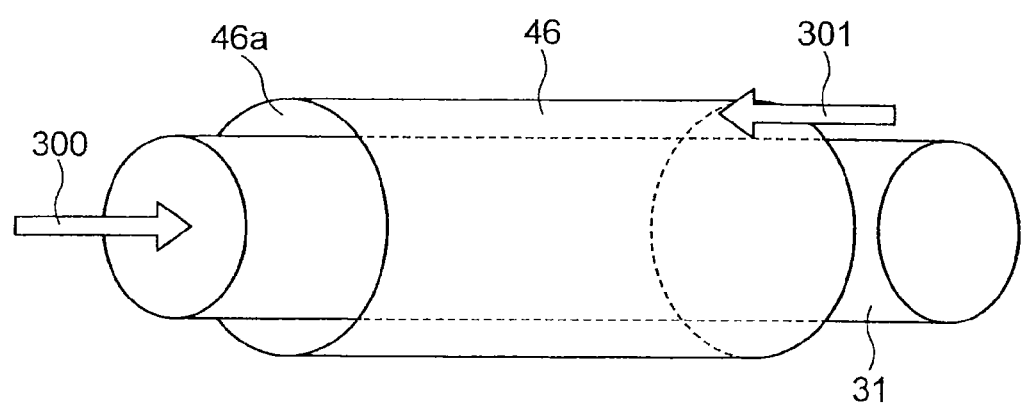
FIG. 15 is a view schematically showing a configuration of drain piping according to a fourth embodiment.

Referring to FIG. 15, a dual pipe structure is formed by disposing a sheath pipe 46 on the outside of the drain pipe 31, the sheath pipe 46 having an inside diameter larger than the outside diameter of the drain pipe 31. A space between the drain pipe 31 and the sheath pipe 46 is used as a refrigerant path 46a. In FIG. 15, a flow of a fluid including a drain comprising steam and a condensate flowing through the drain pipe 31 is indicated by an arrow 300 and a flow of the refrigerant flowing through the refrigerant path 46a is indicated by an arrow 301. The flow of the fluid in the drain pipe 31 and the flow of the refrigerant in the refrigerant path 46a need not be in opposite directions, but may be in the same direction.

Though not shown in FIG. 15, the shut-off valve 60 is disposed downstream in the drain pipe 31 on the right of what is shown in FIG. 15. When the shut-off valve 60 is closed, the working fluid 300 does not flow and remains stagnant.

Figure 16:
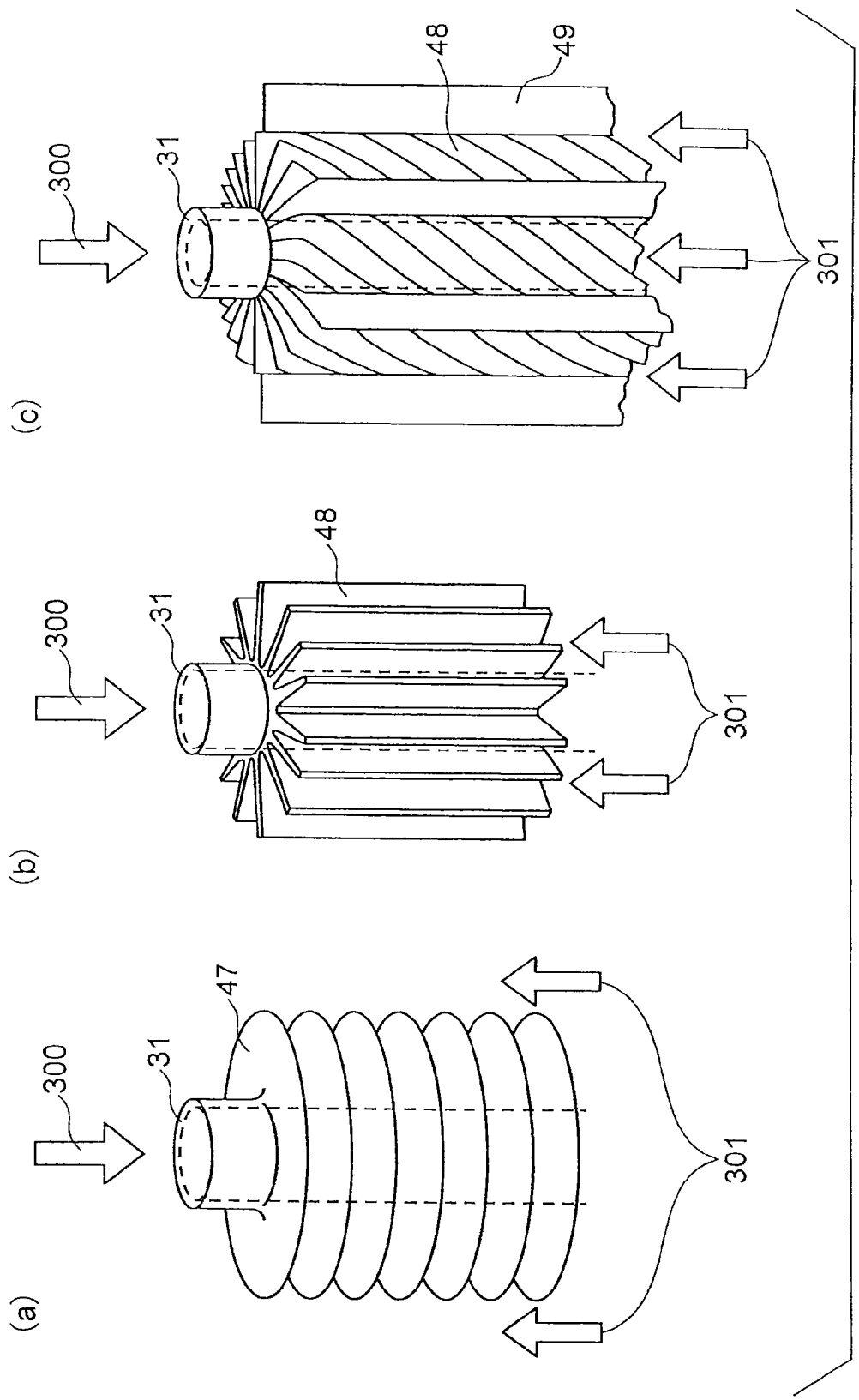
FIG. 16 shows perspective views showing variations of fins disposed on the outer surface of the drain piping according to the fourth embodiment.

The drain pipe 31 shown in FIG. 15 has an ordinary cylindrical outer surface. This is, however, not the only possible configuration and, alternatively, fins 47, 48, 49 may be attached to the outer surface of the drain pipe 31 as shown in FIG. 16. This increases an area of the drain pipe 31 in contact with the refrigerant, thereby promoting heat exchange between the fluid in the drain pipe 31 and the refrigerant in the refrigerant path 46a and improving cooling efficiency. FIG. 16 illustrates possible fin configurations, and the fin configurations are not limited thereto.

Figure 17:
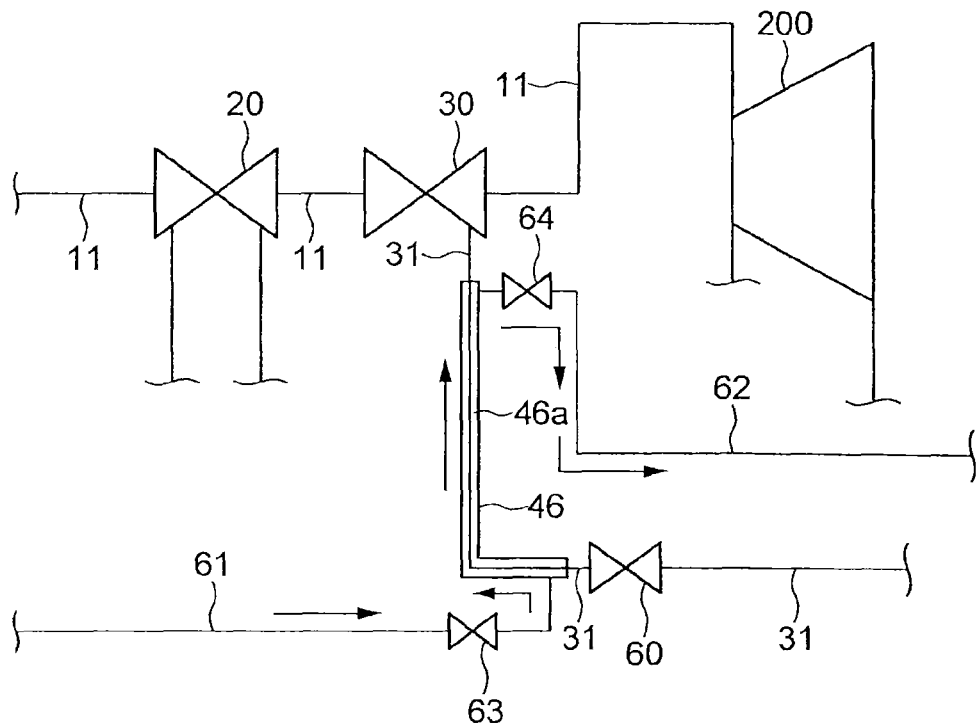
FIG. 17 is a piping diagram for illustrating refrigerant supply in a configuration in which a cooling structure according to the fourth embodiment is disposed in the drain piping downstream of a main steam regulating valve.
Figure 18:
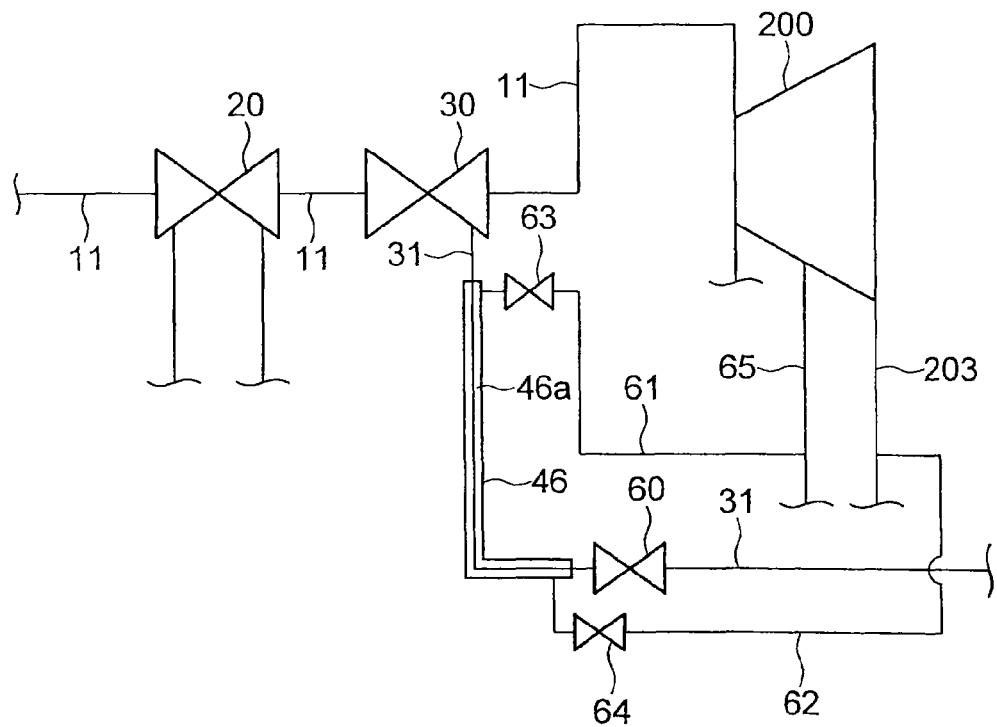
FIG. 18 is a piping diagram for illustrating refrigerant supply in a configuration in which the cooling structure according to the fourth embodiment is disposed in the drain piping of an inner casing for the high-pressure turbine.

A refrigerant supply device for the refrigerant path 46a will be described below with reference to FIGS. 17 and 18. In FIGS. 17 and 18, descriptions for like elements shown in FIG. 3 will be omitted.

The example shown in FIG. 17 will be described below. The sheath pipe 46 described with reference to FIG. 15 covers the section of the drain pipe 31 extending from the position near the branch point from the steam piping 11 to the position near the shut-off valve 60, thus forming a dual pipe structure. A refrigerant supply pipe 61 and a refrigerant discharge pipe 62 are connected to the refrigerant path 46a formed by the dual pipe structure. Valves 63, 64 are disposed in the supply pipe 61 and the discharge pipe 62, respectively. Either one of the valves 63, 64 may be omitted.

In the third embodiment, too, as in the second embodiment, the drain pipe 31 can be prevented from the abnormal overheating by opening the valves 63, 64 to thereby cause the refrigerant to flow through the refrigerant path 46a and the drain pipe 31 to cooled when the thermoacoustic effect can cause abnormal overheating of the drain pipe 31. The direction in which the refrigerant flows at this time is indicated by the arrow in FIG. 17.

As described earlier, reportedly, the abnormal overheating very often stops when the steam turbine is in the steady-state loading condition. Thus, when a condition develops in which the abnormal overheating does not occur, the refrigerant may be stopped from flowing.

The refrigerant used, whether it be liquid or gas, only needs to have a temperature lower than the conventional design temperature of the drain pipe.

An example in which bleed steam supplied from a bleed pipe 65 of the high-pressure turbine 200 is used as the refrigerant will be described below with reference to FIG. 18. The bleed steam is supplied to the refrigerant path 46a via the supply pipe 61 and returned to the main steam exhaust pipe 203 of the high-pressure turbine 200 via the discharge pipe 62.

Steam bleed extracted from a middle stage of the high-pressure turbine 200 flows through the sheath pipe 46. Because part of this steam has done work of rotating the high-pressure turbine 200, the steam has a temperature lower than the main steam temperature. Specifically, the steam, having a temperature sufficiently lower than the temperature of the drain pipe 31, can be said to function as a refrigerant for preventing abnormal overheating of the drain pipe 31.

A configuration is also possible to replace the example shown in FIG. 18 with, for example, a boiler water supply system. Specifically, the configuration draws water that serves as the refrigerant from a high-pressure water supply pipe and supplies the water to the refrigerant path 46a, so that the water as the refrigerant can escape to a low-pressure water supply pipe by way of the discharge pipe 62. In this case, the water is the refrigerant.

In the third embodiment described above, cooling the drain pipe 31 allows the inner surface temperature of the drain pipe 31 to be prevented from overheating abnormally because of the thermoacoustic effect involved.

The refrigerant path 46a can be achieved by not only the dual pipe structure, but also, for example, incorporating a refrigerant path in the drain pipe 31 or providing a refrigerant path through another structure.

<Description of Abnormal Overheating of the Drain Pipe 31>

The following describes how the abnormal overheating occurs in the drain pipe 31.

(1) Description of Heat Generation (Thermoacoustic Effect) by Fluctuations in Pipe Internal Pressure Let f [Hz] be a frequency of fluctuations in pipe internal pressure of a cylinder having an inside diameter of R. According to a literature (Arakawa, Kawahasi, Transactions of the Japan Society of Mechanical Engineers Series B Vol. 62 (1996) No. 598, pp. 2238 to 2245), heat flux q [W/m²] generated by the thermoacoustic effect caused by pressure fluctuations in a boundary layer near a pipe wall can be obtained with expression (2) using the relation of expression (1) in which a pipe internal pressure fluctuation amplitude P is made dimensionless by being divided by an average pipe internal pressure P0.

$$P_1 = P/P_0 \qquad \text{Expression (1)}$$

$$q = K \times \left(\frac{1}{\gamma}\right)^2 \left(\frac{\mu a^2}{\delta/5}\right) P_1^2 \qquad \text{Expression (2)}$$

Where, P1 is a dimensionless pressure amplitude, K is a constant, γ is a ratio of specific heat, μ is a coefficient of viscosity, a is an acoustic velocity, δ is a boundary layer thickness, and R is an inside diameter of the cylinder.

An inner peripheral length of the cylinder is πR. A heating value Q(W/m) of the cylinder per unit length can thus be obtained using expression (3).

$$Q = K \times \left(\frac{1}{\gamma}\right)^2 \left(\frac{\mu a^2}{\delta/5}\right) P_1^2 \pi R \qquad \text{Expression (3)}$$

Let 2πf be an angular frequency ω. Then, the boundary layer thickness δ can be obtained using expression (4).

$$\delta = 5\sqrt{\frac{\nu}{\omega}} \qquad \text{Expression (4)}$$

Where, ν is a coefficient of kinematic viscosity.

Figure 19:
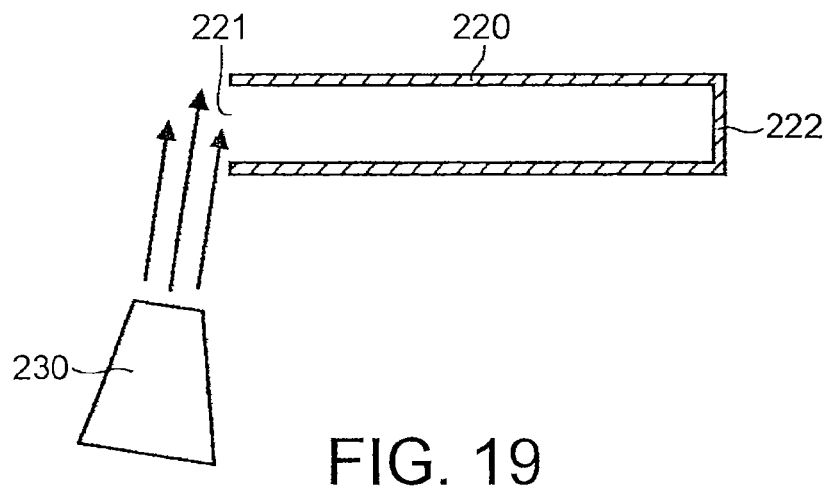
FIG. 19 is a diagram schematically showing a cross section of a pipe and a jet-generating nozzle for illustrating a pipe wall temperature increasing when a pipe end is closed.
Figure 20:
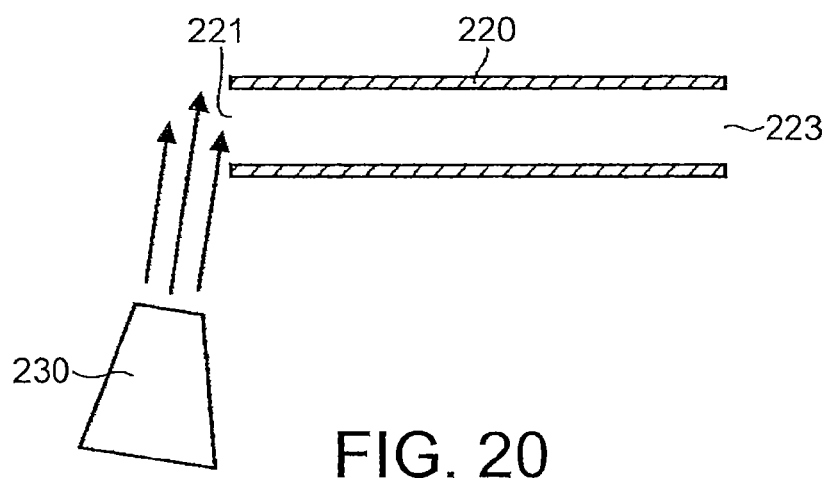
FIG. 20 is a diagram schematically showing the cross section of the pipe and the jet-generating nozzle for illustrating the pipe wall temperature not increasing when the pipe end is open.

(2) Description for a Pipe Wall Temperature Increasing when a Pipe End is Closed and the Pipe Wall Temperature not Increasing when the Pipe End is Open FIG. 19 schematically shows a cross section of a pipe 220 and a jet-generating nozzle 230 for illustrating a pipe wall temperature increasing with a closed end 222 of the pipe 220. FIG. 20 schematically shows the cross section of the pipe 220 and the jet-generating nozzle 230 for illustrating the pipe wall temperature not increasing with an open end 223 of the pipe 220.

When a jet from the nozzle 230 collides with an opening 221 at a first end of the pipe 220, large pressure fluctuations occur in the pipe 220, which causes the thermoacoustic effect to heat the pipe 220 as described in (1) above.

Let T be the pipe wall temperature of the pipe 220. Then, the heating value Q(W/m) of the pipe 220 per unit length caused by the thermoacoustic effect can be obtained using expression (5).

$$\left(Q - c_f \rho_f A_f v \frac{\partial \theta}{\partial x}\right) = c\rho A \frac{\partial T}{\partial t} + hD(T - T_\infty) - \lambda A \frac{\partial^2 T}{\partial x^2} \qquad \text{Expression (5)}$$

Where, c is a specific heat of the material of the pipe 220, ρ is density of the material of the pipe 220, and λ is thermal conductivity of the material of the pipe 220. A is a cross-sectional area of the pipe 220, h is natural convection thermal conductivity of the pipe 220 relative to surroundings, D is a perimeter of the pipe 220, and T∞ is an ambient temperature. Additionally, v is an average flow velocity of a flow through the pipe 220, θ is a temperature of the fluid in the pipe 220, cf is a specific heat of the fluid in the pipe 220, ρf is density of the fluid in the pipe 220, Af is a flow path cross-sectional area of the pipe 220, and x is an axial coordinate of the pipe 220.

No flow occurs in the pipe 220 with the closed end 222 on a second end. Then, v in expression (5) is "0", so that expression (5) is expression (6).

$$Q = c\rho A \frac{\partial T}{\partial t} + hD(T - T_\infty) - \lambda A \frac{\partial^2 T}{\partial x^2} \qquad \text{Expression (6)}$$

If the pipe 220 is a steel pipe having a low thermal conductivity and protected by a heat insulator, the second and third terms of the right side in expression (6) are omitted and expression (6) can be approximated by expression (7).

$$\frac{\partial T}{\partial t} \approx \frac{Q}{c\rho A} \qquad \text{Expression (7)}$$

Flow occurs in the pipe 220 with the open end 223 on the second end. If the pipe 220 is a steel pipe having a low thermal conductivity and protected by a heat insulator, the second and third terms of the right side in expression (5) are omitted and expression (5) can be approximated by expression (8).

$$\frac{\partial T}{\partial t} \approx \frac{1}{c\rho A}\left(Q - c_f \rho_f A_f v \frac{\partial \theta}{\partial x}\right) \qquad \text{Expression (8)}$$

The temperature of the fluid in the pipe 220 can be approximated to be substantially equal to the pipe wall temperature T of the pipe 220. If the relation of expression (9) is satisfied in expression (8), the cooling effect by the flow through the pipe 220 is greater than the heating effect by the thermoacoustic effect, resulting in the pipe wall temperature T being reduced.

$$Q < c_f \rho_f A_f v \frac{\partial \theta}{\partial x} \quad \text{Expression (9)}$$

Figure 21:
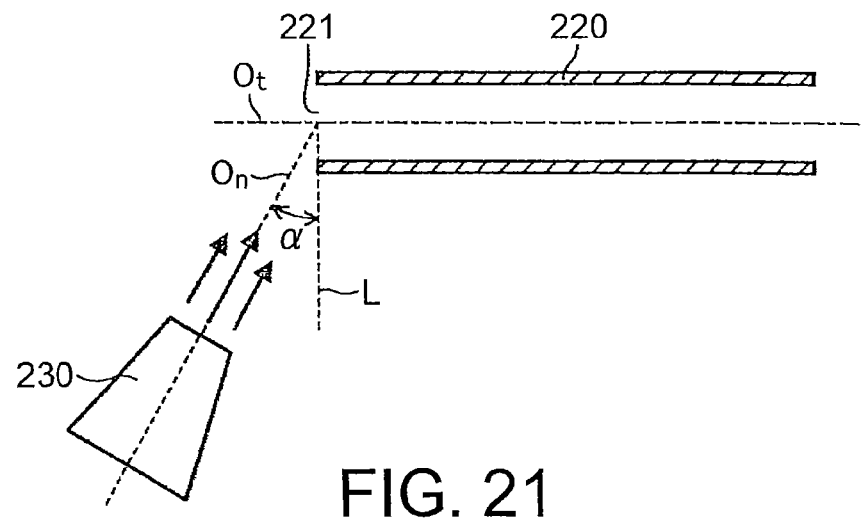
FIG. 21 is a diagram schematically showing a test setup.

Pipe wall temperatures were measured when the pipe end was closed or open. FIG. 21 schematically shows a test setup. It is noted that FIG. 21 represents a condition in which the pipe 220 has open ends.

For the measurement, a stainless-steel pipe 220 was used, the pipe 220 having a length of 360 mm, an inside diameter of 10 mm, and an outside diameter of 120 mm. At the opening 221 of the pipe 220, an angle α formed between a straight line L perpendicular to a central axis Ot of the pipe 220 and a central axis On of the nozzle 230 was 80 degrees. Air with a temperature of 20° C. was jetted from the nozzle 230 in the atmosphere of 20° C. A ratio of pressure Pn immediately upstream of a jet port of the nozzle 230 to atmospheric pressure Pa (Pa/Pn) was 0.44.

An outer wall temperature of the pipe 220 at an axial center position of the pipe 220 was measured with a thermocouple. The measured temperature was assumed to be the pipe wall temperature. When the pipe 220 had a closed second end, the second end was closed with a lid.

Figure 22:
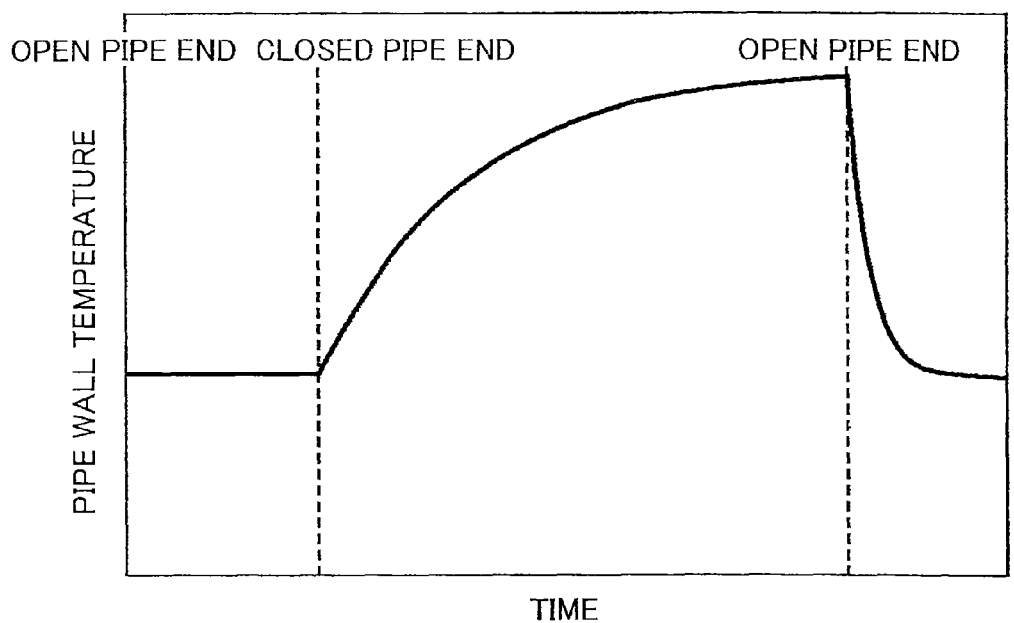
FIG. 22 is a graph showing measurements of the pipe wall temperature when the pipe end is closed or open.

FIG. 22 shows measurements of the pipe wall temperature when the pipe end is closed or open. The measurements were taken when the pipe end was opened, closed, and then opened with a jet from the nozzle 230 colliding with one end of the pipe.

FIG. 22 reveals that the pipe wall temperature increases only while the pipe end is closed. FIG. 22 further reveals that opening the pipe end from its closed position quickly cools the pipe wall. These phenomena agree with evaluations made using the abovementioned expressions. Specifically, the pipe wall temperature does not increase with an open pipe end.

These results suggest that the temperature of the drain pipe 31 that has been described in this specification can be prevented from increasing abnormally when the drain pipe 31 has an open end, specifically, when the shut-off valve 60 downstream of the drain pipe 31 is open. The results further suggest that the temperature increases when the shut-off valve 60 is closed.

The foregoing discussion indicates that having an open end in the drain pipe 31 is one approach to the prevention of the drain pipe 31 from overheating as caused by the thermoacoustic effect. With a view to avoiding a change in the fluid line as a result of having the open end, however, this application focuses on the relational expressions of expression (8) and expression (9) cited above and proposes, as another approach to the prevention of the drain pipe 31 from overheating as caused by the thermoacoustic effect, to increase the heat capacity equivalent mass of the drain pipe 31 or to promote heat dissipation of the drain pipe 31 or to cool the drain pipe 31 from the outside.

The above-described embodiments can prevent the abnormal overheating in the steam turbine piping system and thus provide highly reliable steam turbine piping.

Currently, the configuration of each of the above-described embodiments is applicable as the drain piping that reportedly develops the abnormal overheating due to the thermoacoustic effect to the post-valve-seat drain pipe 31 of the upper half-side main steam regulating valve 30 and the inner casing drain pipe 33 in the high-pressure turbine 200. The configuration of each of the above-described embodiments is nonetheless applicable to any piping with a shut-off valve in which the abnormal overheating due to the thermoacoustic effect is confirmed, e.g., drain piping.

When the configuration of each of the above-described embodiments is applied to the inner casing drain pipe 33, the configuration may be applied, for example, to a range that extends from a position at which the inner casing drain pipe 33 leaves the outer casing 205 to a position near the shut-off valve 60'.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the invention.

The invention claimed is:

1. A steam turbine facility, comprising:
    a steam turbine including a turbine casing;
    main steam piping that supplies steam from a boiler to the steam turbine;
    a main steam regulating valve provided in the main steam piping to adjust a flow rate of steam supplied to the steam turbine;
    drain piping provided to discharge a drain produced during warming-up of the steam turbine, the drain piping being either a valve drain pipe that leads a drain from the main steam regulating valve to an outside thereof, or a casing drain pipe that leads a drain from the turbine casing to an outside thereof;
    a shut-off valve, disposed on the drain piping, that opens when the warming-up is being performed and closes after completion of the warming-up; and
    a heat absorber disposed in a range, upstream of the shut-off valve, of the drain piping to absorb heat of the drain piping when abnormal overheating of the drain piping occurs under a condition that the shut-off valve is closed after completion of the warming-up of the steam turbine.

2. The steam turbine facility according to claim 1, wherein the heat absorber comprises a plurality of ring-shaped members each being spaced apart from each other in a longitudinal direction of the drain piping.

3. The steam turbine facility according to claim 2, further comprising a heat-insulating material surrounding the ring-shaped members, wherein a cavity empty of the heat-insulating material is defined between adjacent ring-shaped members.

4. The steam turbine facility according to claim 1, wherein the heat absorber comprises a single tubular member disposed to extend over the longitudinal direction of the drain piping.

5. The steam turbine facility according to claim 2, wherein the ring-shaped members constituting the heat absorber are formed separately from the drain piping and then connected together to the drain piping.

6. The steam turbine facility according to claim 2, wherein the ring-shaped members constituting the heat absorber each comprise two heat absorber half bodies that are fastened together so as to sandwich the drain piping and are thus connected to the drain piping.

7. The steam turbine facility according to claim 2, wherein the heat absorber is provided by a thick-walled portion of the drain piping.

8. The steam turbine facility according to claim 7, wherein the drain piping comprises a first portion and a second portion as the thick-walled portion joined to the first portion, the second portion having a thickness greater than a thickness of the first portion.

9. The steam turbine facility according to claim 8, wherein the first portion and the second portion are formed separately from each other and then connected to each other.

10. The steam turbine facility according to claim 1, wherein the heat absorber is configured such that heat capacity equivalent mass of the drain piping and the heat absorber mounted thereon has a value required for absorbing an abnormal overheat that can occur internally in the drain piping by a thermoacoustic effect when the shut-off valve disposed in the drain piping is closed.

11. A steam turbine facility, comprising:
a steam turbine including a turbine casing;
main steam piping that supplies steam from a boiler to the steam turbine;
a main steam regulating valve provided in the main steam piping to adjust a flow rate of steam supplied to the steam turbine;
drain piping provided to discharge a drain produced during warming-up of the steam turbine, the drain piping being either a valve drain pipe that leads a drain from the main steam regulating valve to an outside thereof, or a casing drain pipe that leads a drain from the turbine casing to an outside thereof;
a shut-off valve, disposed on the drain piping, that opens when the warming-up is being performed and closes after completion of the warming-up; and
a cover provided to surround a range, upstream of the shut-off valve, of the drain piping in which abnormal overheating of the drain piping occurs under a condition that the shut-off valve is closed after completion of the warming-up of the steam turbine, the cover preventing contact with a surface of the drain piping, the cover being configured to allow a gas to flow therethrough, wherein no heat-insulating material is disposed around the drain piping in the range.

12. The steam turbine facility according to claim 11, wherein the cover comprises a mesh jacket.

13. The steam turbine facility according to claim 11, further comprising a blower that sends a cooling gas toward the cover.

14. A method for operating the steam turbine facility according to claim 13, comprising:
under a condition in which an abnormal overheat can occur internally in the drain piping by a thermoacoustic effect when the shut-off valve disposed in the drain piping is closed, operating the blower to send cooling air toward the cover; and
cooling the drain piping using the cooling air that flows through the cover.

15. A steam turbine facility, comprising:
a steam turbine including a turbine casing;
main steam piping that supplies steam from a boiler to the steam turbine;
a main steam regulating valve provided in the main steam piping to adjust a flow rate of steam supplied to the steam turbine;
drain piping provided to discharge a drain produced during warming-up of the steam turbine, the drain piping being either a valve drain pipe that leads a drain from the main steam regulating valve to an outside thereof, or a casing drain pipe that leads a drain from the turbine casing to an outside thereof;
a shut-off valve, disposed on the drain piping, that opens when the warming-up is being performed and closes after completion of the warming-up; and
a removable heat-insulating jacket disposed to surround a range, upstream of the shut-off valve, of the drain piping in which abnormal overheating of the drain piping occurs under a condition that the shut-off valve is closed after completion of the warming-up of the steam turbine.

16. The steam turbine facility according to claim 15, wherein the heat-insulating jacket comprises two half bodies, a hinge joint that connects the two half bodies with each other to allow the two half bodies to be opened and closed, and a locking arrangement that maintains the two half bodies in a closed stage.

17. A method for operating the steam turbine facility according to claim 15, comprising:
under a condition in which an abnormal overheat can occur internally in the drain piping by a thermoacoustic effect when the shut-off valve disposed in the drain piping is closed, removing the heat-insulating jacket from the drain piping to thereby promote heat dissipation from the drain piping; and
under any other condition, mounting the heat-insulating jacket on the drain piping.

18. A steam turbine facility, comprising:
a steam turbine including a turbine casing;
main steam piping that supplies steam from a boiler to the steam turbine;
a main steam regulating valve provided in the main steam piping to adjust a flow rate of steam supplied to the steam turbine;
drain piping provided to discharge a drain produced during warming-up of the steam turbine, the drain piping being either a valve drain pipe that leads a drain from the main steam regulating valve to an outside thereof, or a casing drain pipe that leads a drain from the turbine casing to an outside thereof;
a shut-off valve, disposed on the drain piping, that opens when the warming-up is being performed and closes after completion of the warming-up;
a refrigerant path disposed to surround the drain piping, the refrigerant path cooling the drain piping in which abnormal overheating of the drain piping occurs under a condition that the shut-off valve is closed after completion of the warming-up of steam turbine; and
a refrigerant circulating arrangement that circulates refrigerant through the refrigerant path.

19. The steam turbine facility according to claim 18, wherein the refrigerant path is formed between the drain piping and a sheath pipe that surrounds an outside of the drain piping, and the drain piping has fins on an outside surface thereof, the fins protruding to the refrigerant path.

20. The steam turbine facility according to claim 18, wherein the refrigerant circulating arrangement is formed such that steam from a turbine bleed is supplied as the refrigerant to the refrigerant path to cool the drain piping and an exhaust discharged from the refrigerant path is returned to a high-pressure turbine exhaust.

21. The steam turbine facility according to claim 18, wherein the refrigerant circulating arrangement is formed such that a drain from a high-pressure water supply system is supplied as the refrigerant to the refrigerant path to cool the drain piping and waste water discharged from the refrigerant path is returned to a low-pressure water supply system.

22. A method for operating the steam turbine facility according to claim 18, comprising:
    under a condition in which an abnormal overheat can occur internally in the drain piping by a thermoacoustic effect when the shut-off valve disposed in the drain piping is closed, causing the refrigerant to flow through the refrigerant path, thereby cooling the drain piping.

23. A steam turbine facility of claim 1, wherein the drain piping carries liquid from condensed steam to the outside.

* * * * *